United States Patent [19]
Furness et al.

[11] Patent Number: 5,714,681
[45] Date of Patent: Feb. 3, 1998

[54] DOUBLE CARCASS HOSE FAILURE DETECTION SYSTEM

[76] Inventors: Robert L. Furness, 2701 NE. 8th St., Pompano Beach, Fla. 33062; Eric M. Hiner, 11040 NW. 18th Manor, Plantation, Fla. 33322; David Lloyd Estep, 7400 NW. 35th Ct., Lauderhill, Fla. 33319; Bert Sherman, 4826 NW. 104th Ter., Coral Springs, Fla. 33076

[21] Appl. No.: 649,140

[22] Filed: May 14, 1996

[51] Int. Cl.⁶ .................................................. G01M 3/08
[52] U.S. Cl. ............................... 73/40.5 R; 73/49.2
[58] Field of Search .......................... 73/40.5 R, 49.2; 340/605; 138/104

[56] References Cited

U.S. PATENT DOCUMENTS

| | | | |
|---|---|---|---|
| 3,339,415 | 9/1967 | Wild | 73/40.5 |
| 3,800,217 | 3/1974 | Lowrance | 324/54 |
| 3,834,235 | 9/1974 | Bouton et al. | 73/293 |
| 3,990,003 | 11/1976 | Agee, Jr. et al. | 324/52 |
| 4,088,987 | 5/1978 | Resler et al. | 340/242 |
| 4,095,174 | 6/1978 | Ishido | 324/52 |
| 4,171,520 | 10/1979 | Adamson | 340/152 T |
| 4,206,402 | 6/1980 | Ishido | 324/61 R |
| 4,270,049 | 5/1981 | Tanaka et al. | 250/227 |
| 4,286,464 | 9/1981 | Tauber et al. | 73/293 |
| 4,386,269 | 5/1983 | Murphy | 73/40.5 R X |
| 4,465,105 | 8/1984 | Slater | 138/104 |
| 4,723,441 | 2/1988 | Sweeney | 73/40.5 R |
| 4,736,193 | 4/1988 | Slocum et al. | 340/522 |
| 4,749,855 | 6/1988 | Watanabe | 250/227 |
| 4,764,671 | 8/1988 | Park | 250/227 |
| 4,775,855 | 10/1988 | Cox | 340/605 |
| 4,876,530 | 10/1989 | Hill et al. | 340/605 |
| 4,961,069 | 10/1990 | Tsaprazis | 340/619 |
| 4,973,946 | 11/1990 | Cowden, II | 340/605 |
| 5,005,005 | 4/1991 | Brossia et al. | 340/604 |
| 5,022,045 | 6/1991 | Elliott | 374/20 |
| 5,058,420 | 10/1991 | Vali et al. | 73/49.2 |
| 5,074,663 | 12/1991 | Winterton et al. | 340/605 X |
| 5,111,201 | 5/1992 | Matsumura et al. | 340/606 X |
| 5,134,377 | 7/1992 | Reddy, III et al. | 324/533 |
| 5,186,357 | 2/1993 | Foster | 222/1 |
| 5,187,366 | 2/1993 | Hopenfeld | 73/40.5 R X |
| 5,200,615 | 4/1993 | Hopenfeld | 250/302 |
| 5,202,667 | 4/1993 | Alvin | 340/605 |
| 5,279,157 | 1/1994 | Mattis et al. | 73/290 R |
| 5,291,032 | 3/1994 | Vali et al. | 250/577 |
| 5,343,191 | 8/1994 | McAtamney | 340/605 |
| 5,343,736 | 9/1994 | Cady et al. | 73/40 |
| 5,343,738 | 9/1994 | Skaggs | 73/40.5 R |
| 5,376,927 | 12/1994 | Kidd | 340/522 |
| 5,399,876 | 3/1995 | LaClair | 250/577 |
| 5,452,076 | 9/1995 | Schopper et al. | 356/128 |
| 5,551,484 | 9/1996 | Charboneau | 138/104 |

*Primary Examiner*—Hezron E. Williams
*Assistant Examiner*—Jay L. Politzer
*Attorney, Agent, or Firm*—Malin, Haley, DiMaggio & Crosby

[57] ABSTRACT

Disclosed an electro-optical sensor which preferably is used to detect leaks in marine surface and submarine antipollution hoses which are used to transfer petroleum products to and from ships. The electro-optical sensor is located in housings that allow petroleum products of varying viscosity's to flow to the sensor. A variety of alarm methods can be used to signal that a leak has occurred in the hose.

25 Claims, 13 Drawing Sheets

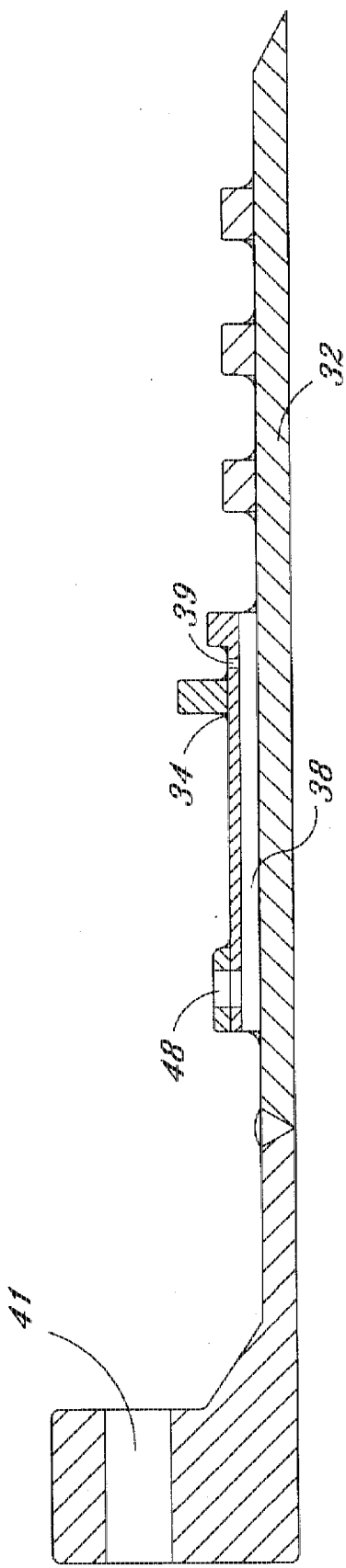
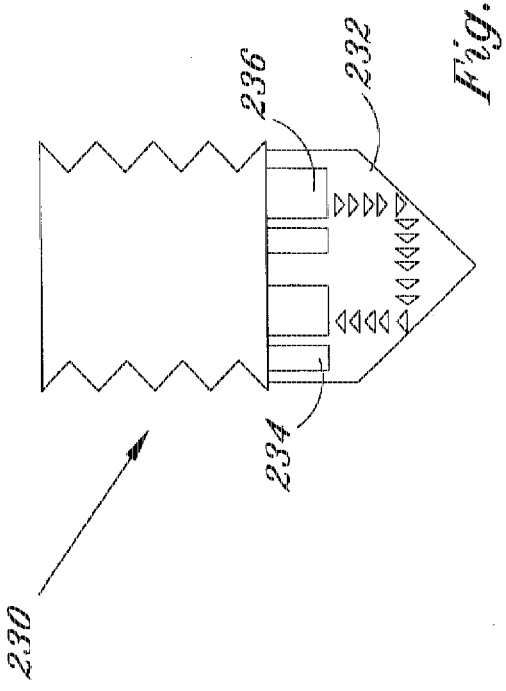

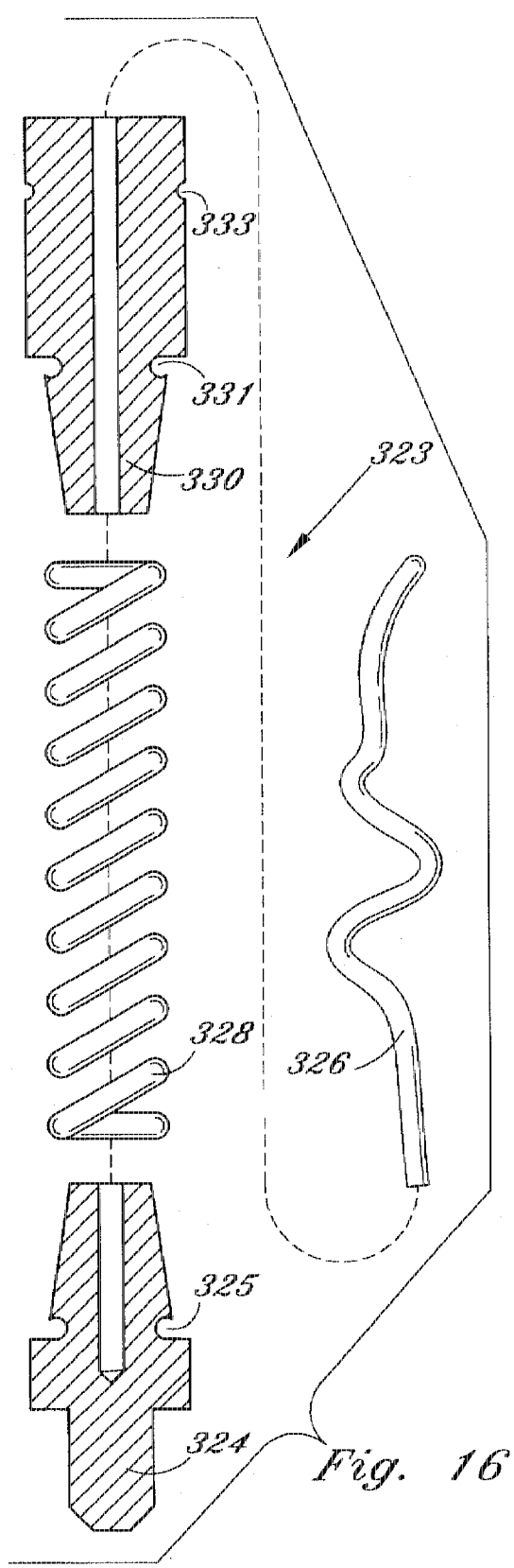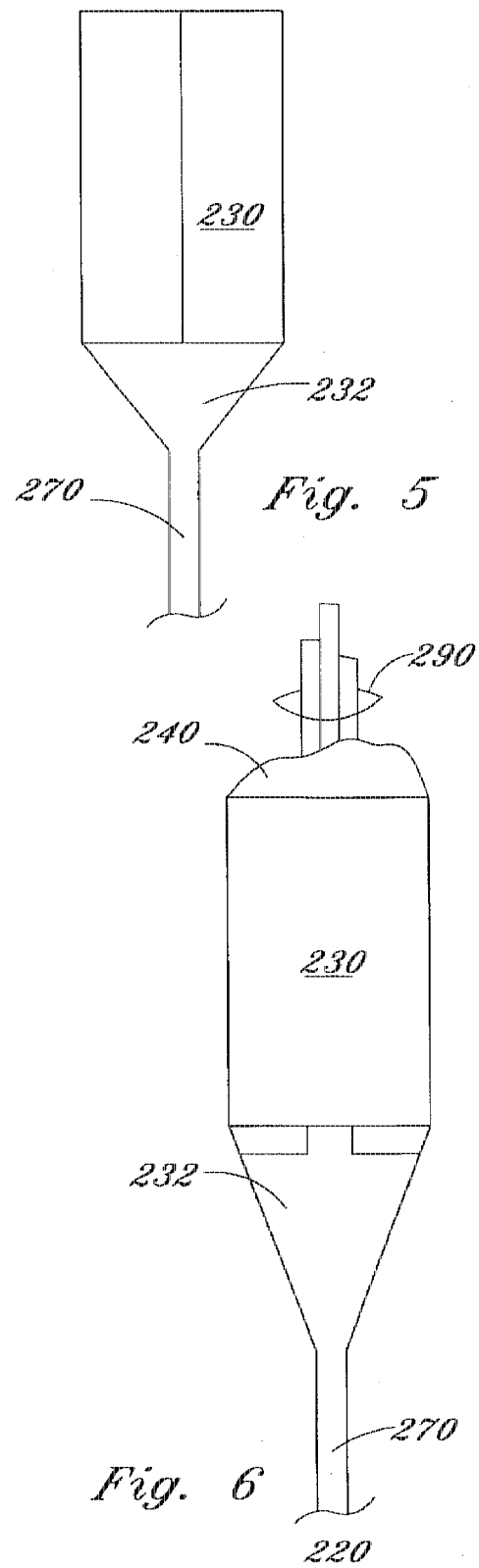

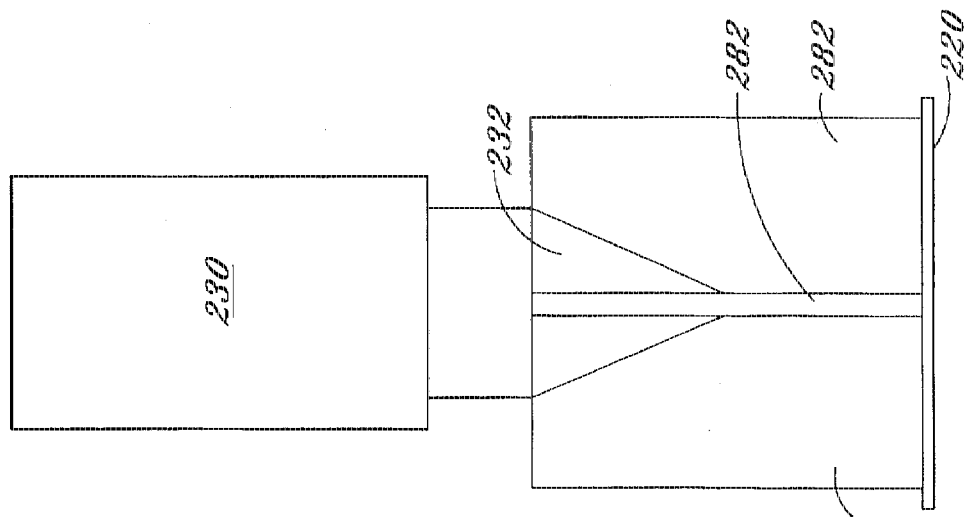
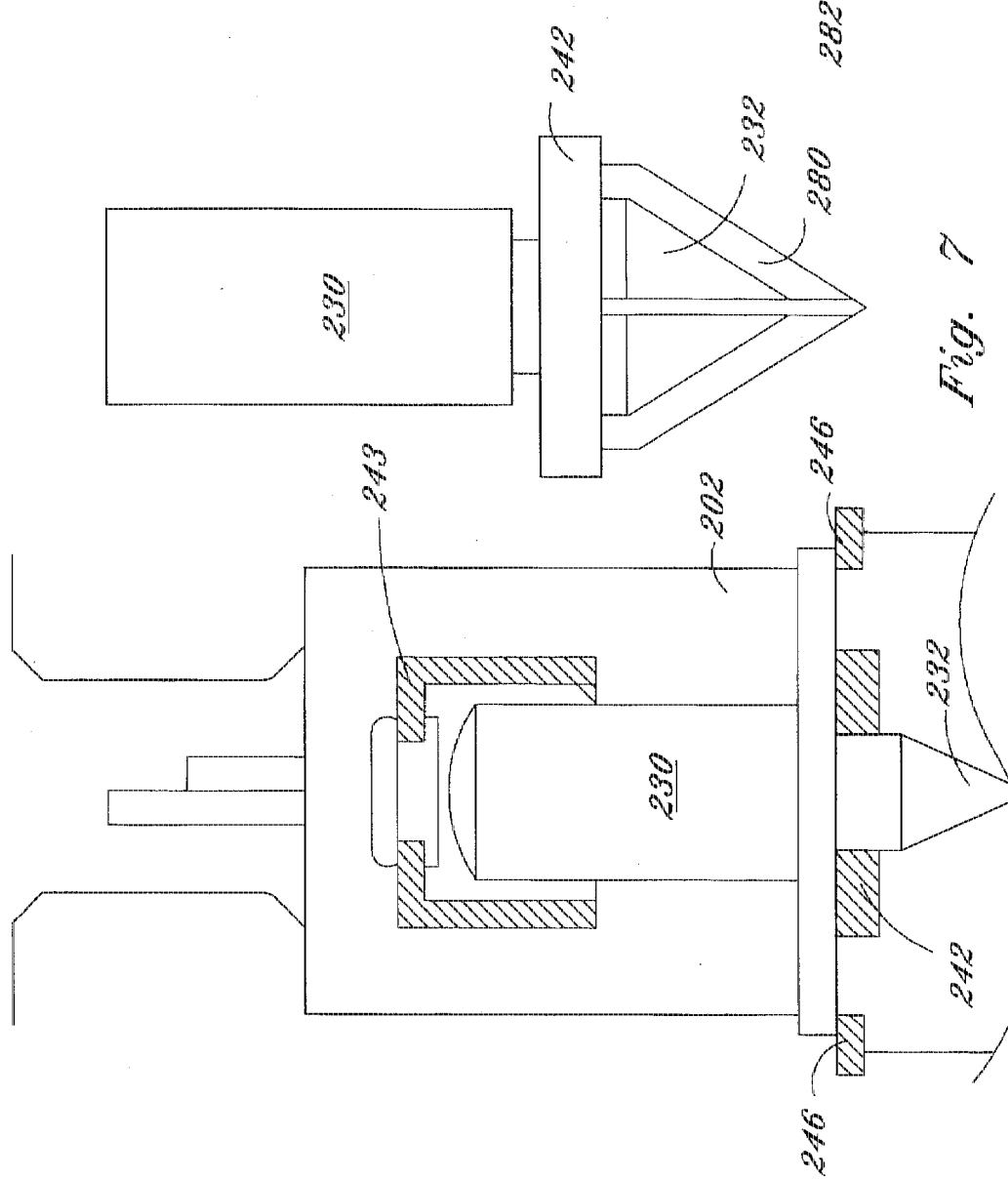

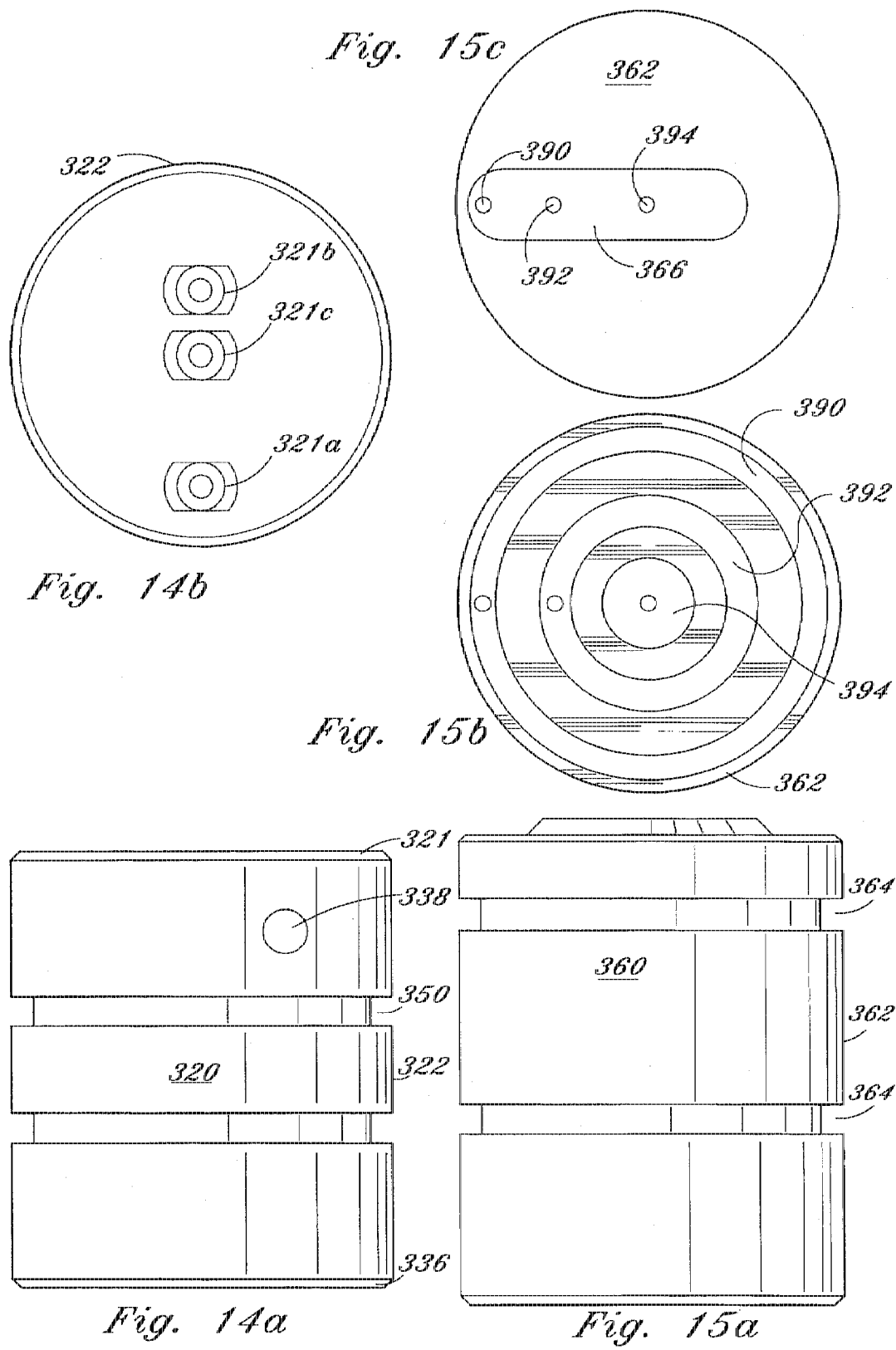

DOUBLE CARCASS HOSE FAILURE DETECTION SYSTEM

BACKGROUND OF THE INVENTION

1. Field of the Invention

The present invention relates generally to double carcass anti-pollution hoses, and more particularly to an electrical or electro-optical failure detection system for double carcass hoses.

2. Description of the Prior Art

Petroleum products are transferred from ships to or from shore installations through anti-pollution hoses that may float on the surface of the water, be partially submerged or fully submerged. When fully submerged, the hoses travel vertically down to the bottom of the water body, and then horizontally along (either on top or below the water body) until the shore installation site is reached.

Anti-pollution hoses consist of two reinforced elastomeric carcasses that are mechanically or chemically bonded to a hose nipple at each end of the hose. The double carcass hose normally consist of a manufacturer's standard submarine or floating hose with a secondary outer carcass designed to retain any fluid which may have escaped from the inner carcass due to a slow leak or sudden failure of the inner carcass. The inner carcass carries the fluids being transferred and creates a barrier to the outside environment. The outer carcass is unpressurized by the transfer of fluids and provides a secondary containment if the inner carcass carrying the transferred fluids is breached. A hose air chamber is created between the inner carcass and the outer carcass.

Hose nipples are provided to bond or connect respective ends of two double carcass hoses together, thus, providing continual fluid communication between the hoses. The hose nipples are provided with an inner member which mates to the inner carcass by conventional means and an outer member which mates with the outer carcass also by conventional means. The hose nipples are then clamped together by conventional means such as by bolt and nut combinations, to form one continuous anti-pollution hose. Preferably, a sealing means can be provided to seal the point where the hose nipples are clamped together.

A hose nipple air chamber is formed between the inner member and the outer member of the hose nipple and is communication with the air chamber formed between the inner carcass and the outer carcass when the hose nipple is properly attached to the end of the double carcass hose. Thus, the hose nipple also consists of a chamber that establish an annulus where fluids that may breach either the inner carcass or the outer carcass may travel and fill.

The inner carcass can be breached under various circumstances, including, but not limited to, inadvertent collisions with marine vessels or debris in the water. Another possible area for breaching the inner carcass and allowing petroleum to leak is where the inner carcass is attached to the inner member of the hose nipple. The inner carcass can also be breached by a pressure pulse or a pressure surge (spike) due to the pumping operations which could cause the inner carcass to rupture.

The breach of the inner carcass can allow petroleum, which normally travels through the inner carcass, to enter within the air chamber formed between the inner carcass and the outer carcass and ultimately within the hose nipple air chamber. If the outer carcass has been somehow damage, a potential exist for the petroleum to escape into the body of water, possibly creating a harmful condition for human, marine and plant life in the adjacent area.

Damage to the outer carcass can occur in several ways, including, but not limited to, propeller cuts, wire cable swipes, and inadvertent collisions with marine vessels or debris in the water. If the propeller is large enough, it could possibly cut the inside carcass in addition to the outer carcass. In addition to possibly allowing petroleum to escape, damage to the outer carcass also presents the problem of allowing fluids such as salt water, brackish water and/or fresh water to enter within the double carcass hose. Another possible area for breaching the outer carcass and allowing water to enter within the double carcass hose is where the outer carcass is attached to the outer member of the hose nipple.

The leakage of fluids such as petroleum out of the double carcass hose and fluids such as water into the double carcass hose can create numerous problems, as well as possibly harmful conditions. To detect such leakages a cellulose (paper) and chemical powder combination were provided to absorb leakage fluids. The combination formed a trigger body which would force a diaphragm to close to activate a light/alarm assembly. However, several limitations with the cellulose/chemical combination were immediately apparent. First, it became very difficult to maintain consistency in the absorption of the fluids. Second, there existed the potential of having a small explosion with the use of the device, thus, creating additional and possibly larger problems than the problems the device was intended to correct.

Thus, what is needed in the art is a system for detecting leaks in double carcass hoses, which is efficient and safe to operate. What is also needed is a system which can operate for a long time, before requiring replacing of the power means of the system, thus, allowing the hoses to be undisturbed for longer periods of time. It is therefore, to the effective resolution of the aforementioned problems and shortcomings that the present invention is directed.

SUMMARY OF THE INVENTION

The present invention provides an electro-optical sensor preferably used to detect leaks in marine surface and submarine anti-pollution double carcass hoses used to transfer petroleum to and from ships. The electro-optical sensor is located in a housing that allow petroleum products of varying viscosities to flow to the sensor should a leak occur. A variety of alarm methods can be used to signal that a leak has occurred in the hose. Generally the present invention consists of two parts, a fluid leakage detector incorporating the electro-optical sensor and an alarm device.

The hose nipples, discussed above, are provided with a threaded top opening and a threaded bottom opening that expose the annulus of the hose nipple. Preferably, the fluid leakage detector is attached to the hose nipple and communicates therewith via the threaded bottom opening and the alarm device is attached to the hose nipple via the threaded top opening. Although it is preferred that the threaded openings utilized are disposed at the top and bottom of the hose nipple, such is not limiting, and threaded openings located at other positions along the circumference of the hose nipple may be utilized.

Location of the fluid leakage detector and alarm device on the hose nipple are dependent on the orientation of the double carcass anti-pollution hose in the water body. Furthermore, the end of the hose where the leakage detector and alarm device is installed is dependent on the orientation of the hose in the water body.

The electro-optical sensor utilizes an infrared beam which senses fluid levels when the beam is deflected by fluid touching the outboard surface of a prism material (plastic or glass) and essentially effectively optically "expanding" the prism's wall thickness and deflecting the beam away from the sensor's pick-up. The electro-optical sensor can be vertically or horizontally oriented, and is held in place by a perforated support plate. The support plate allows fluid flow around the supported sensor and is locked in position by an internal retaining ring.

The electronic circuits provided with the system provide for periodically powering up the electro-optical fluid sensor and allowing the electro-optical fluid sensor to determine the wet or dry condition within the fluid leakage detector housing body. The periodically powering or polling of the sensor helps to extend the life of the power means utilized, which in the preferred embodiment is a lithium battery pack.

Accordingly, it is an object of the present invention to provide an electro-optical sensor for detecting the presence of fluid in floating, submarine or buried submarine double carcass hoses.

It is another object of the present invention to provide an electro-optical sensor for sensing the presence of fluids within a specific range of viscosity's and/or within a specific range of temperatures.

It is yet another object of the present invention to provide an electro-optical sensor which distinguishes between gases and fluids within a specific range of temperatures.

It is still another object of the present invention to provide electrical means for turning the electro-optical sensor periodically off and on to extend the life of a battery member which provides power to the sensor.

It is a further object of the present invention to provide electrical means for providing a latching function and an electro-optical sensor latching function to eliminate false alarms and improve the intrinsic safety of the electro-optical sensor.

It is a still further object of the present invention to provide means for calculating the statistical confidence of alarm signals produced by the electro-optical sensor.

It is an even still further object of the present invention to provide a signal during leakage conditions.

It is still another object of the present invention to extend the life of or increase the safety of marine life which may be subject to harmful conditions during leakage conditions.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIG. 2 is a sectional view of a portion of the hose nipple in accordance with the present invention;

FIG. 5 is a front view of a first embodiment of a cylindrical reed in accordance with the present invention;

FIG. 6 is a front view of a second embodiment of a cylindrical reed in accordance with the present invention;

FIG. 7 is a front view of a first embodiment of a leaf reed in accordance with the present invention;

FIG. 8 is a front view of a second embodiment of a leaf reed in accordance with the present invention;

FIG. 10 is a side sectional view illustrating a deflection plate in accordance with the present invention;

FIG. 13 is a front view of the electro-optical sensor in accordance with the present invention.

FIG. 14$a$ is a front plan view of the upper contact housing in accordance with the present invention;

FIG. 14$b$ is a top view of the upper contact housing shown in FIG. 14$a$;

FIG. 15$a$ is a front plan view of the lower contact housing in accordance with the present invention;

FIG. 15$b$ is a top view of the lower contact housing shown in FIG. 15$a$;

FIG. 15$c$ is a bottom view of the lower contact housing shown in FIG. 15$a$;

FIG. 16 is an exploded view of the upper contact assembly in accordance with the present invention;

DESCRIPTION OF THE PREFERRED EMBODIMENTS

Figure 1:
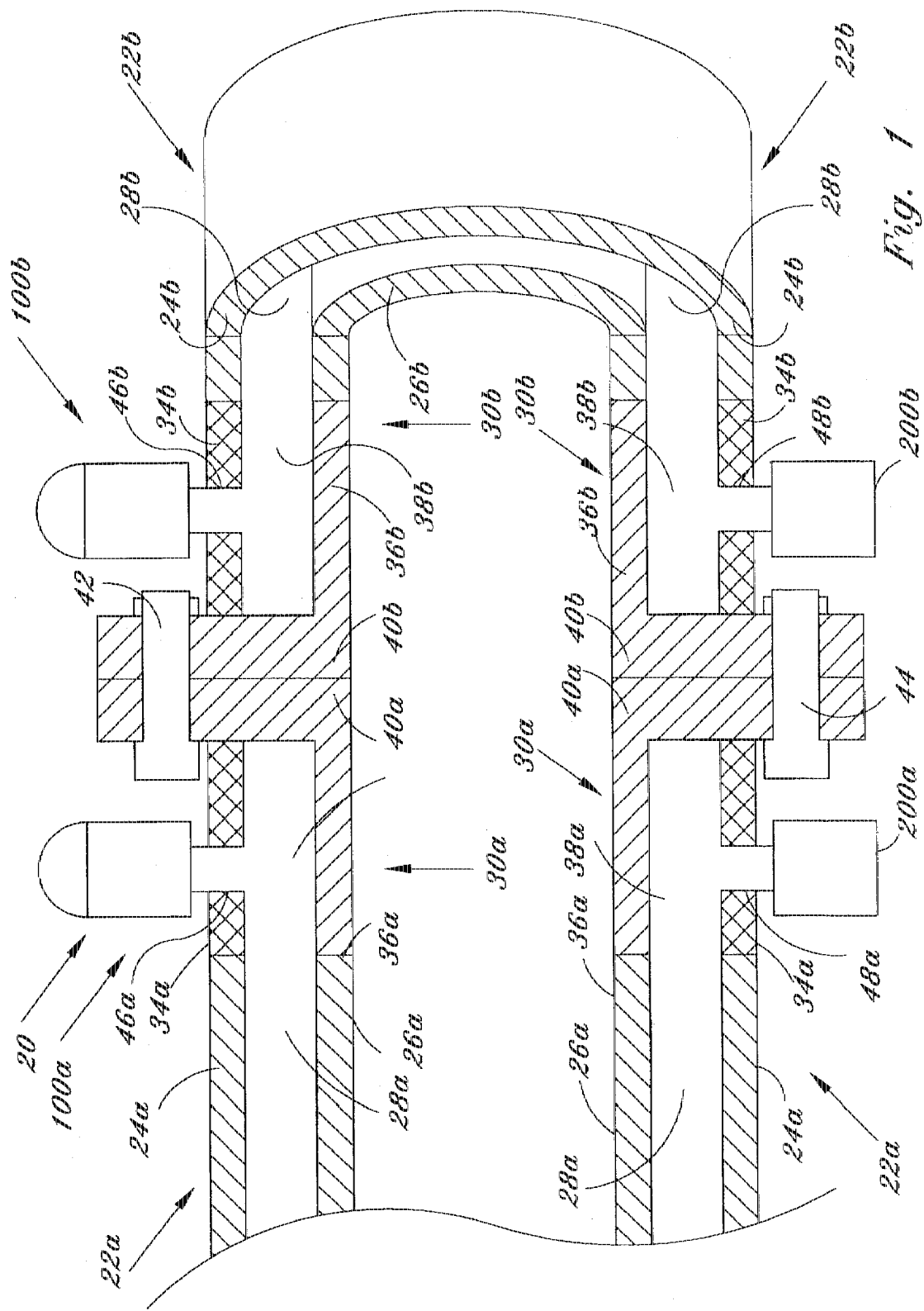
FIG. 1 is an overall system diagram generally illustrating the fluid leakage detector/floating alarm device in accordance with the present invention.

As seen in FIG. 1 the present invention fluid leakage detection system is generally illustrated as system (fluid vessel) 20. A first anti-pollution hose 22$a$ is shown consisting of an outer carcass 24$a$ and an inner carcass 26$a$. Inner carcass 26$a$ carries fluids being transferred and creates a barrier to the outside environment. Outer carcass 24$a$ is unpressurized by the transfer of fluids and provides a secondary containment if inner carcass 26$a$ carrying the transferred fluids is breached. A hose air chamber 28$a$ is created between inner carcass 26$a$ and outer carcass 24$a$. A second anti-pollution hose 22$b$ is shown consisting of an outer carcass 24$b$ and an inner carcass 26$b$. A hose air chamber 28$b$ is created between inner carcass 26$b$ and outer carcass 24$b$. Second hose 22$b$ is similar to first hose 22$a$ is structure and function. Though the present invention will be discussed in conjunction with two hoses (22$a$ and 22$b$), it is to be understood, that this is not limiting and in use a plurality of hoses, connected by associated hose nipples, discussed below, can be provided depending on the distance requirements of the fluid transfer situation.

Hose nipples 30$a$ and 30$b$ are provided to bond or connect respective ends of double carcass hoses 22$a$ and 22$b$, respectively, together, thus, providing continual fluid communication between hoses 22$a$ and 22$b$. Hose nipple 30$a$ is provided with an inner flange member 36a which mates, at its outer end, to inner carcass 26a, by conventional means and an outer flange member 34a which mates, at its outer end, with outer carcass 24a also by conventional means. The opposite ends of inner flange member 36a and outer flange member 34a are constructed integral with a body member 40a to form a one-piece hose nipple 30a.

A hose nipple air chamber 38a is formed between inner flange member 36a and outer flange member 34a and is in communication with air chamber 28a formed between inner carcass 26a and outer carcass 24a when hose nipple 30a is properly attached to the end of double carcass hose 22a (hose nipple air chamber 28a and double carcass hose air chamber 38a will often collectively be referred to throughout as "air chamber 38a"). Thus, hose nipple 30a consists of a chamber 38a that establishes an annulus where fluids that may breach either inner carcass 26a or outer carcass 24a may travel and fill. Hose nipple 30a is provided with a first threaded opening 46a and a second threaded opening 48a. Threaded openings 46a and 48a each extend entirely through outer flange member 34a.

Similarly, hose nipple 30b is provided with an inner flange member 36b which mates, at its outer end, to inner carcass 26b, by conventional means and an outer flange member 34b which mates, at its outer end, with outer carcass 24b also by conventional means. The opposite ends of inner flange member 36b and outer flange member 34b are constructed integral with a body member 40b to form a one-piece hose nipple 30b.

A hose nipple air chamber 38b is formed between inner flange member 36b and outer flange member 34b and is in communication with air chamber 28b formed between inner carcass 26b and outer carcass 24b when hose nipple 30b is properly attached to the end of double carcass hose 22b (hose nipple air chamber 28b and double carcass hose air chamber 38b will often collectively be referred to throughout as "air chamber 38b"). Accordingly, hose nipple 30b consists of a chamber 38b that establishes an annulus where fluids that may breach either inner carcass 26b or outer carcass 24b may travel and fill. Hose nipple 30b is provided with a first threaded opening 46b and a second threaded opening 48b. Threaded openings 46b and 48b each extend entirely through outer flange member 34b.

Once hose nipples 30a and 30b are properly attached to hoses 22a and 22b, respectively, they are clamped together by conventional means such as by bolt/nut combinations 42 and 44, to form a continuous anti-pollution hose.

FIG. 2 illustrates a portion of hose nipple 30. An annulus opening 39 is provided to allow leakage fluids to enter air chamber 38. Threaded opening 48 is illustrated which is in communication with air chamber 38 and which will mate with the attachment portion of leakage detector 200. Threaded opening 46, though not shown in FIG. 2, will be similar in structure and will mate with the attachment portion of a hose fitting 300. The outer carcass hose mates with outer flange member 34 preferably by a chemical and/or mechanical bond, while the inner carcass hose mates with inner flange member 32 also preferably by a chemical and/or mechanical bond. Lastly, passageway 41 is provided to receive a clamping bolt which is associated with a locking nut to from bolt/nut combination 42 for locking two hose nipples 30 together.

Referring back to FIG. 1, fluid leakage detectors 200a and 200b are shown attached to outer flange members 34a and 34b, respectively, by mating of exterior threads disposed on detectors 200a and 200b with respective threaded openings 48a and 48b. Similarly, alarm devices 100a and 100b are shown attached to outer flange members 34a and 34b, respectively, by mating of exterior threads disposed on alarm devices 100a and 100b with respective threaded openings 46a and 46b.

Preferably, floating alarm device 100 and fluid leakage detector 200 are substantially cylindrical in shape. However, this is not limiting and other shapes which do not require any modification to existing hose nipple 30 are within the scope of the invention.

Figure 3:
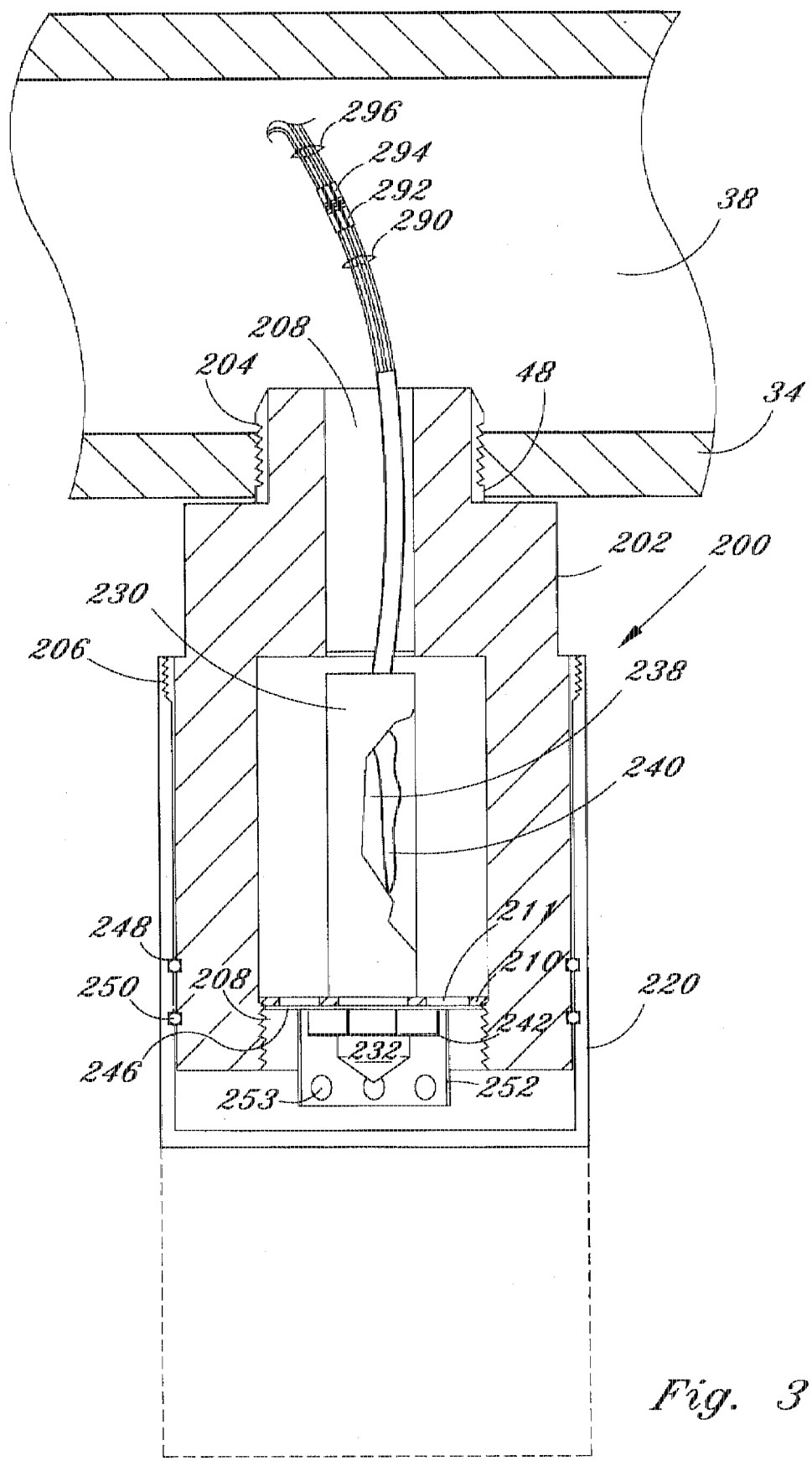
FIG. 3 is a sectional view of the fluid leakage detector shown in FIG. 1.
Figure 4:
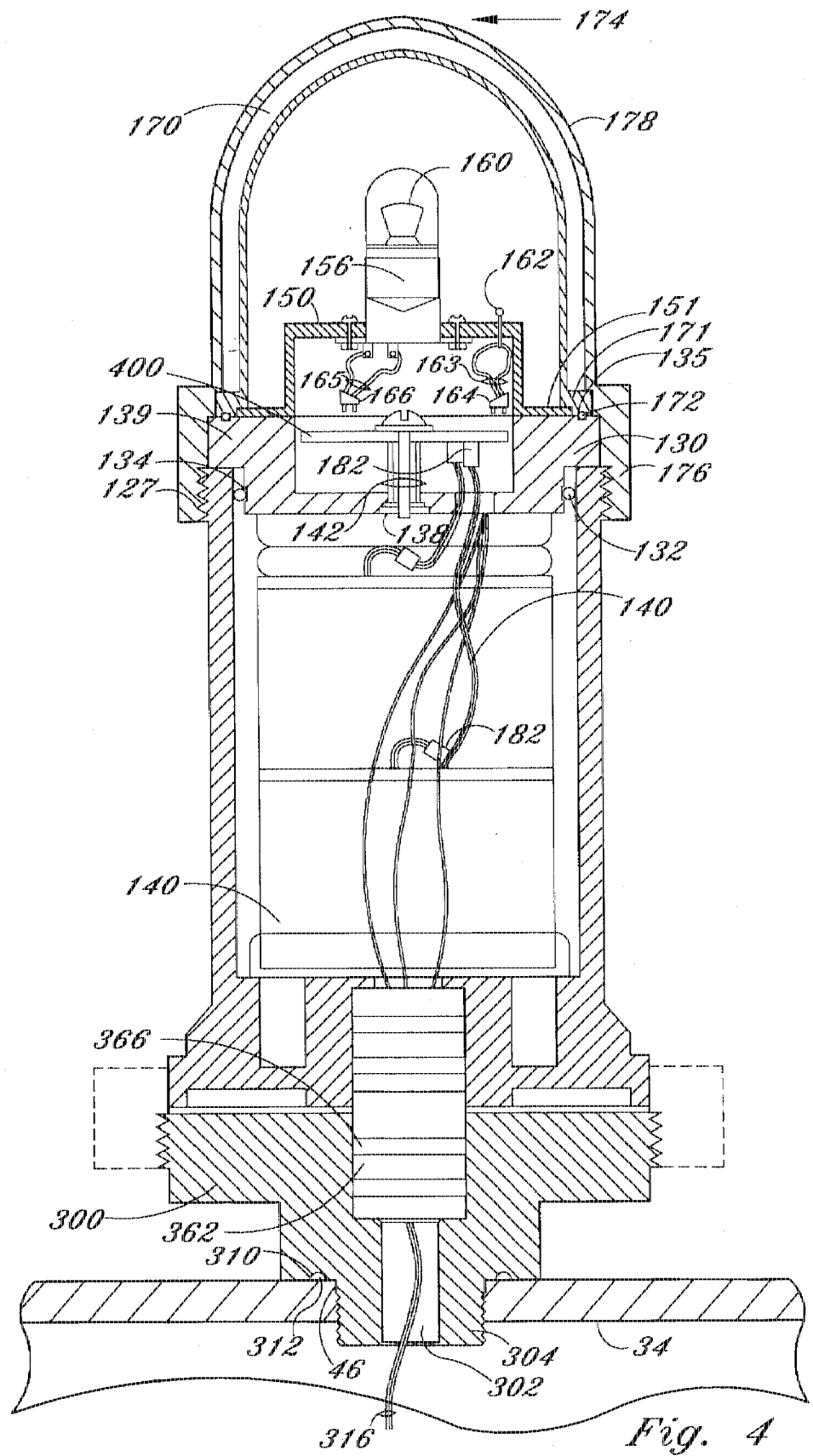
FIG. 4 is a sectional view of the floating alarm device shown in FIG. 1.

FIG. 3 illustrates the fluid leakage detector in accordance with the present invention which is generally designated as detector 200 and generally consisting of a tubular housing 202 and an electro-optical sensor 230. Housing 202 is provided with a first set of exterior threads 204 for mating with threads 48 of outer flange member 34 for attaching detector 200 to hose nipple 30. Housing 202 is also provided with a second set of exterior threads 206 for mating with interior threads of a closed end cap 220, discussed in further detail below.

First exterior threads 204 are preferably three-quarter (¾) inch to mate to the annulus 48 of hose nipple 30. This mating connection between housing 202 and hose nipple 30 is sealed by a sealing ring such as o-ring 203. Throughout references may be made to the use of o-rings for sealing purposes. However, it should be recognized that other sealing means, such as quad rings, may be substituted for the o-rings and are considered within the scope of the invention. Furthermore, the groove associated with each o-ring may be depicted as being square or round. This should also not be considered limiting and any geometry shapes for the groove which will provide for sufficient sealing of the intended area can be utilized and are considered within the scope of the invention.

Preferably, housing body 202 is turned counterclockwise the same number of turns as the number of exterior threads prior to attaching housing body 202 to hose nipple 30 to compensate for the twisting of housing body 202 clockwise when attaching to hose nipple (mating of threads 202 with threaded opening 48). This assures that the wires are not twisted when detector 200 is attached to hose nipple 30.

A passageway 208 extends therethrough from a first end of housing 202 to its second end. A support plate 210 extends across passageway 208 intermediate the first end and the second end of housing 202. Support plate 210 is maintained within housing body 202, adjacent to a housing flange, by conventional means such as a snap/retaining ring 246. Support plate 210 provides support and helps to properly position sensor 230 which is mounted to support plate 210. Sensor 230 is locked and held adjacent to support plate 210 by conventional means such as a threaded nut 242 and a washer (not shown).

Support plate 210 contains openings 211 which allow leaking fluids to flow to and be captured by closed end cap 220 and ultimately trigger sensor 230. Support plate openings 211 are shaped and dimensioned to allow leakage fluids of a wide range of viscosity's and temperatures, as well as certain particulates, to flow from hose nipple opening (annulus) 48 through housing 202 pass sensor 230, through openings 211 and into closed end cap 220. Support plate openings 211 are also shaped and dimensioned to block particulates of certain sizes from entering closed end cap 220.

Figure 9:
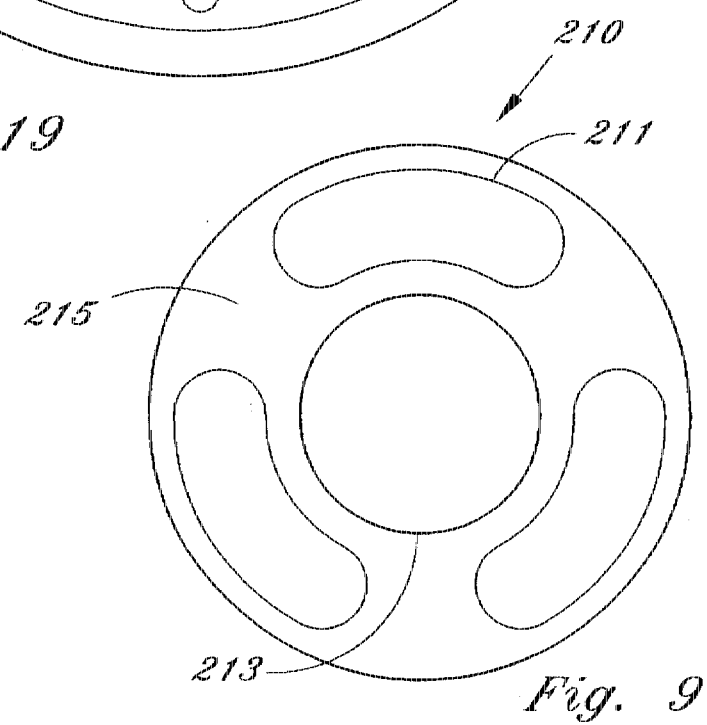
FIG. 9 is a top view of the support plate member in accordance with the present invention.

Preferably, plate openings 211 are kidney shaped (FIG. 9), though such is not limiting and other shape designs which will allow the passage of fluids having a wide range of viscosity's and temperatures are within the scope of the present invention. A center opening 213 is provided for the insertion of a portion of sensor 230. A top portion 231 of sensor 230 is larger in diameter than opening 213 and rests upon a top surface 215 of support plate 210 when sensor 230 is properly positioned. Support plate 210 holds sensor 230 in place and is itself locked in position by an internal retaining ring 246.

Leakage fluids normally include petroleum products, salt water, brackish water or fresh water. However, such is not limiting, and other fluids which may utilized with the double carcass hose or which may leak into the double carcass hose are also considered within the scope of the present invention.

As stated above, detector 200 utilizes an solid state electro-optical liquid trigger sealed sensor 230 (FIG. 3). Sensor 230 includes a sealed prism member 232. A light detector or receiver 234 and light source 236 (infrared light emitting diode) are provided in the base of prism 232 to measure the internal reflection or refraction of the light emitted from light source 236 into a fluid medium contacting the exterior surface of prism 232 to judge the wet or dry condition of prism 232. A light detector circuit 238 is also provided and is electrically associated with light detector 234. Light source 236 can be a light emitted diode (LED).

Light from LED 236 is directed into prism 232 which forms the tip of sensor 230. With no liquid present, light from LED 236 is reflected within prism 232 to receiver 234. When rising liquid immerses prism 232, the light is refracted out into the liquid, leaving little or no light to reach receiver 234. Sensing this change, via circuitry 238, receiver 234 actuates switching means, also via circuitry 238, within sensor 230 to operate an external alarm, such as alarm 100.

Sensor 230's output can be an open collector TTL/CMOS compatible output. Sensor 230's output provides an open output in dry conditions, and a grounded output in wet conditions. Liquid trigger sensor 230 preferably is positioned within housing 202 such that a volume of 1.0 cubic inches of fluid captured within closed end cap 220 will trigger sensor 230. Closed end cap 220 is preferentially dimensioned to create volumes that will accommodate condensation from the cavity of the double carcass hose without creating a false leakage alarm signal whether the double carcass hose is positioned vertically or horizontally.

The orientation of sensor 230 allows it to be entirely exposed to the charge or discharge fluids. Thus, the level of any leakage fluids collected within attached cap 220 must bridge the distance between light source 236 and light detector 234 before the electrical threshold in light detector circuit 238 will change an output signal of sensor 230 from a "dry" signal to a "wet" signal. Sensor 230 can also be designed to distinguish between gases and fluids within a specific range of temperatures.

Electrical circuit 238 is protected from leakage fluid by an elastomeric potting compound 240. A deflection plate 243 may be added to protect elastomeric potting compound 240 from direct impingement of leakage in applications where the leakage fluid pressure exceeds the strength of the elastomeric bond on elastomeric potting compound 240. Plate 243 also deflects the mechanical force of discharge fluids entering hose nipple chamber 38 under high pressure from impinging directly on the weakest structure of sensor 230.

The exterior surface of housing 202 can be provided with at least one groove 248 for receiving an associated sealing o-ring 250. Preferably, two grooves 248 and corresponding o-rings 250 are provided. O-rings 250 are dimensionally aligned with the inner wall surface of cap 220, which acts as a sealing surface. When cap 220 is properly attached to housing 202, as discussed above, a water and fluid tight fluid vessel is formed.

The outer wall surface of closed end cap 220 is preferably knurled to provide an exterior surface that is easy to grip to help avoid losing cap 220 over the side of installation ships or maintenance boats.

Baffles 252 can also be provided and preferably positioned within closed end cap 220 to reduce or eliminate fluids from collecting on prism 232 which may be caused by tidal, weather, or ship induced movements within the string of connected hoses. Baffles 252 are preferably a cylindrical hood which may or may not have at least one cross hole 253 drilled through it. Cross holes 253 can be provided to allow a release or escape path for trapped air. Baffle 252 can also be captured or attached, via nut 242, to support plate 210 and retaining ring 246. Baffle 252 is provided to prevent captured fluids in closed end cap 220 from sloshing enough to make sufficient contact with prism 232 to cause it to sense that it is "wet".

Thus, baffles 252 impede turbulent movement of condensation fluids within closed end cap 220 when hose nipple 30 is positioned at any angles between vertical and horizontal, with a rate of angular change consistent with movement caused by tidal, weather, or ship induced forces. Baffles 252 also assist kidney shaped openings 211 in support plate 210 to change the shape of the fluid pressure pulse and peak mechanical force applied to sensor 230 by the discharge fluids entering fluid leakage detector 200. Lastly, baffles 252 provide protection to sensor prism 232 from inadvertent damage during handling and installation.

Closed end cap 220 is preferably dimensioned to accommodate expected non-leakage fluid volume which may be present from the collection of moisture condensing out of air trapped in the double walls and hose nipples. Without this clearance properly accounted for, this non-leakage fluid may trigger sensor 230, thus, possibly producing a false alarm signal.

A cylindrical reed 270 (FIG. 5) can be attached to the tip of prism 232 to preferentially collect and disperse condensation moisture from the face of prism 232. Alternatively, cylindrical reed 270 (FIG. 6) can be attached at a first end to closed end cap 220 and dimensioned so that when closed end cap 220 is installed, cylindrical reed 270 is abutting and adjacent to the tip of prism 232 to also allow condensation moisture collecting on the surface of prism 232 to be dispersed from prism 232 when the drop of moisture touches cylindrical reed 270.

In an alternative embodiment, leaf reeds 280 (FIG. 7) are attached to threaded nut 242 and are preferentially abutting prism 232 to drain condensation from the surface of sensor prism 232. Alternatively, a leaf reed assembly 282 (FIG. 87) can be attached at one end to closed end cap 220. When cap 220 is properly attached to housing body 202, leaf reed assembly 282 is abutting prism 232 to drain condensation from the surface of sensor prism 232.

Electrical wires 290 which are associated with sensor 230 are terminated within electrical connector 292 that connect to mating connectors 294 which at their opposite are attached to wires 296. Wires 296 are substantially disposed within air chamber 38 of hose nipple 30 and are attached at their respective opposite ends to a lower contact or carrier assembly 360, which is discussed in detail below. Lower contact assembly 360 is mounted within a center cavity of a hose fitting 300 with a top portion of lower contact assembly 360 protruding outward from hose fitting 300 for guiding and centering a battery enclosure 120.

The selected wires and cables which may be exposed directly to water or petroleum should be chosen to assure that they do not swell or show evidence of liquid intrusion or evidence of loss of mechanical or electrical strength after immersion in the liquids for the expected alarm duration. The wires and cables should be provided with an insulating material which will not degrade when immersed in liquids for the duration the liquids are present.

Lower contact assembly 360 includes a housing body 362 preferably provided with a pair of grooves 364 for receiving o-rings 366 which are disposed around lower housing body 362. Though two o-rings 366 are preferred, such is not limiting and other total amounts of o-rings such as one (1) or three (3) may be provided and are within the scope of the invention. O-rings 366 seal the mating relationship between lower contact assembly 360 and the cavity of hose fitting 300.

Hose fitting 300 is provided with an attachment portion 304 which is attached to hose nipple by the mating of its exterior threads 306 and threaded opening 46. Hose fitting is provided with a wire receiving passageway 302 which is in communication with the cavity of hose fitting 300. Hose fitting 300 is provided with a groove 310 which receives an o-ring to provide a seal approximately at the point where hose fitting 300 is attached to hose nipple 30. Hose fitting is also provided with exterior threads 308 for mating with interior threads of a clamp nut 314.

Preferably, hose fitting 300 is turned counterclockwise the same number of turns as the number of exterior threads prior to attaching hose fitting 300 to hose nipple 30 to compensate for the twisting of hose fitting 300 clockwise when attaching to hose nipple 30 (mating of threads 306 with threaded opening 46). This assures that wires 316 are not twisted when floating alarm device 100 is attached to hose nipple 30.

When floating anti-pollution hoses are utilized, a floating alarm device 100 is attached to hose fitting 300 by conventional means such as clamp nut 314. Once hose fitting 300 with attached floating alarm device 100 is threaded on to hose nipple 30 at opening 46 and fluid leakage detector 200 is threaded on to hose fitting 300 a fluid vessel 20 is formed.

Floating alarm device 100 is a modular light assembly consisting of a battery enclosure 120 having a cover 130, a three ring pin connector (upper contact assembly) 320, o-rings 322 which are installed within grooves 350 disposed on the outside of connector 320 to seal battery enclosure 120, a lithium battery pack 140, o-ring seal 132 which is installed within a groove 134 disposed on cover 130, printed wiring assembly 400 (electronic circuit board), a light source support 150, a light source base 156, a light source 160, a magnetic test switch 162, a colored lens 170, a lens gasket 172, a lens protective cap 174, and electrical cables 180 terminating with locking connectors 182. Preferably lithium battery pack 140 and electronic circuit board 400 can be disconnected without the use of any hand tools.

Light source 160 for floating alarm device 100 may be incandescent filament, gas discharge, light emitting diodes, or electroluminescent. Light is directed in horizontal and vertical planes. The light may be continuous, flashing or strobing with intervals selected to differentiate light source from marine navigational lights. Effective light intensity of the flashing and strobing light sources is selected to provide a visual signal in foul weather. Light source colors are selected to both differentiate light source 160 from other marine navigational lights and to improve the conspicuity of light source 160. Preferably, light source 160 is flashed one (1) to four (4) times per second.

Light source 160 can be designed to direct light horizontally in a circular pattern with the light concentrated between five (5) degrees above the horizontal plane and thirty-five (35) above the horizontal plane. Light emitted from light source 160 should only be blocked by support ribs 178 on lens protective cover 174. The color of light source 160 preferably is amber though such is not limiting.

Lithium battery pack 140 conceals the cell size and cell arrangements to deter theft of battery 140. Preferably, battery 140 is a "C" size. The lithium cell utilized preferably has a solid cathode and a chemically and thermally stable electrolyte. Battery enclosure 120 should be capable of withstanding environmental conditions and functional performance requirements of floating hose vessel 20. Battery enclosure 120 prevents dust, moisture or other foreign material from reaching the battery cells and also prevents any leakage from the battery cells from reaching electronic circuit assembly 400. Furthermore, battery 140 should also be adequately protected from making contact with any conductive surface(s) of battery compartment 120.

Battery pack 140 maintains its centered position within battery enclosure 120 by one of several ways. First, a closed cell foam (not shown) can be wrapped around battery pack 140 which fills the space between battery 140 and enclosure 120, thus, preventing movement of battery 140. Second, the foam can be placed at the ends of battery 140 around its edges which accomplishes the same advantages as the first method. Lastly, a two part resin foam can be poured into battery enclosure 120 around battery 140, thus also filling the space between battery 140 and enclosure 120.

The bottom portion of battery enclosure 120 defines a passageway 122 which receives upper contact assembly (connector) 320. Passageway 122 is in communication with enclosure area 124 where battery pack 140 is housed. The outer top portion of battery enclosure 120 is provided with exterior threads 127 for mating with internal threads (not shown) of a base member 176 of protective cap 174.

A cavity 136 is defined by enclosure cover 130. Circuit assembly 400 is disposed within cavity 136 and attached by conventional means (i.e. bolts, screws, etc.), in conjunction with a small passageway 138 which is also defined by enclosure cover 130. Preferably, an aperture is provided in the center of assembly 400 for receipt of a machine screw which in conjunction with a standoff, stud, lock washer and nut attached assembly 400 to cover 130. This attachment combination is generally designated as reference numeral 142. The stand-off mechanically relates circuit board 400 to the top of battery cover 130.

Wires or cables 145, coming from battery pack 140 and from connector 320 attached to printed circuit assembly 400 via locking electrical connectors 182.

Enclosure cover 130 contains a top flange member 139 which rest upon the top surface of battery enclosure 120 when cover 130 is properly positioned. Lens gasket 172 sits within a groove 135 in cover 130 and prevents water from entering the light assembly of alarm device 100. Gasket 172 can be an o-ring or a flat gasket. Other conventional sealing members are also considered within the scope of the invention.

Light source support 150 is positioned on the top surface of battery enclosure cover 130 and includes an outer lower flange 151 which fits within a groove defined by colored lens 170 and cover 130 to maintain light source support 150 in position. Light source base 156 and magnetic reed switch 162 are disposed on top of light source support 150 and extend through openings defined by support 150. Preferably, switch 162 is attached to support by adhesive, while light source base 156 is attached by associated threaded hardware.

A lens protective cap 174 can be provided and consists of base member 176 and rib member 178. A colored lens 170, preferably amber, is attached to protective cap 174 by insertion of a lower lens flange within a groove defined by base member 176 and cover 130. Colored lens 170 is preferably constructed from acrylic. However, other materials such as glass, transparent plastic, polycarbonate, etc. may be utilized and are considered within the scope of the invention.

Protective cap 174 attaches to battery enclosure 120 by mating its base member 176's internal threads with exterior threads 127 disposed on battery enclosure. To quickly attend to an element of floating alarm device 100 either protective cap 174 or clamp nut 314 can be quickly twisted off from its mating relationship depending on the area of device 100 which needs servicing.

Figure 19:
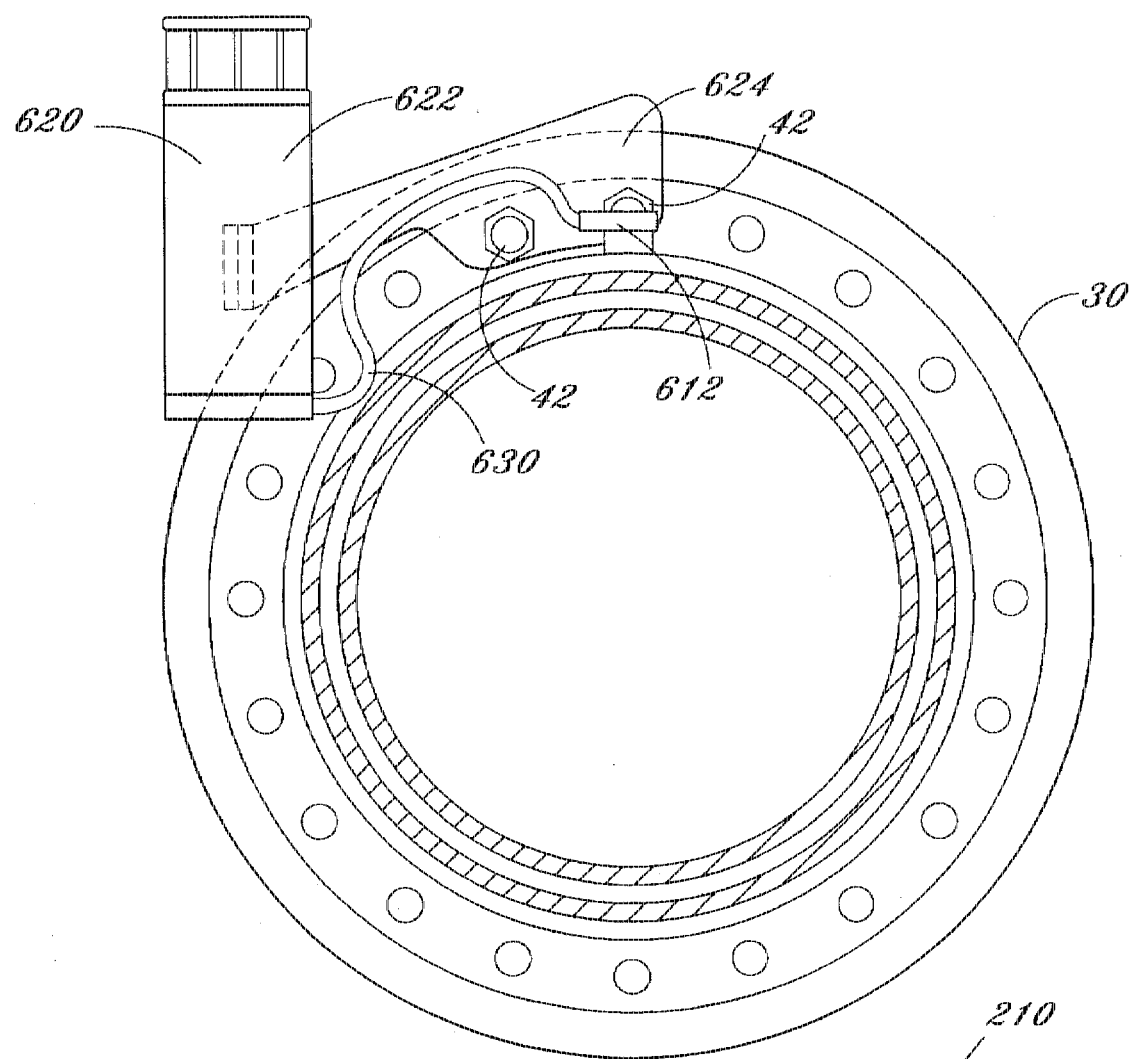
FIG. 19 is a front view of a portion of the submarine transponder alarm device in accordance with the present invention.
Figure 20:
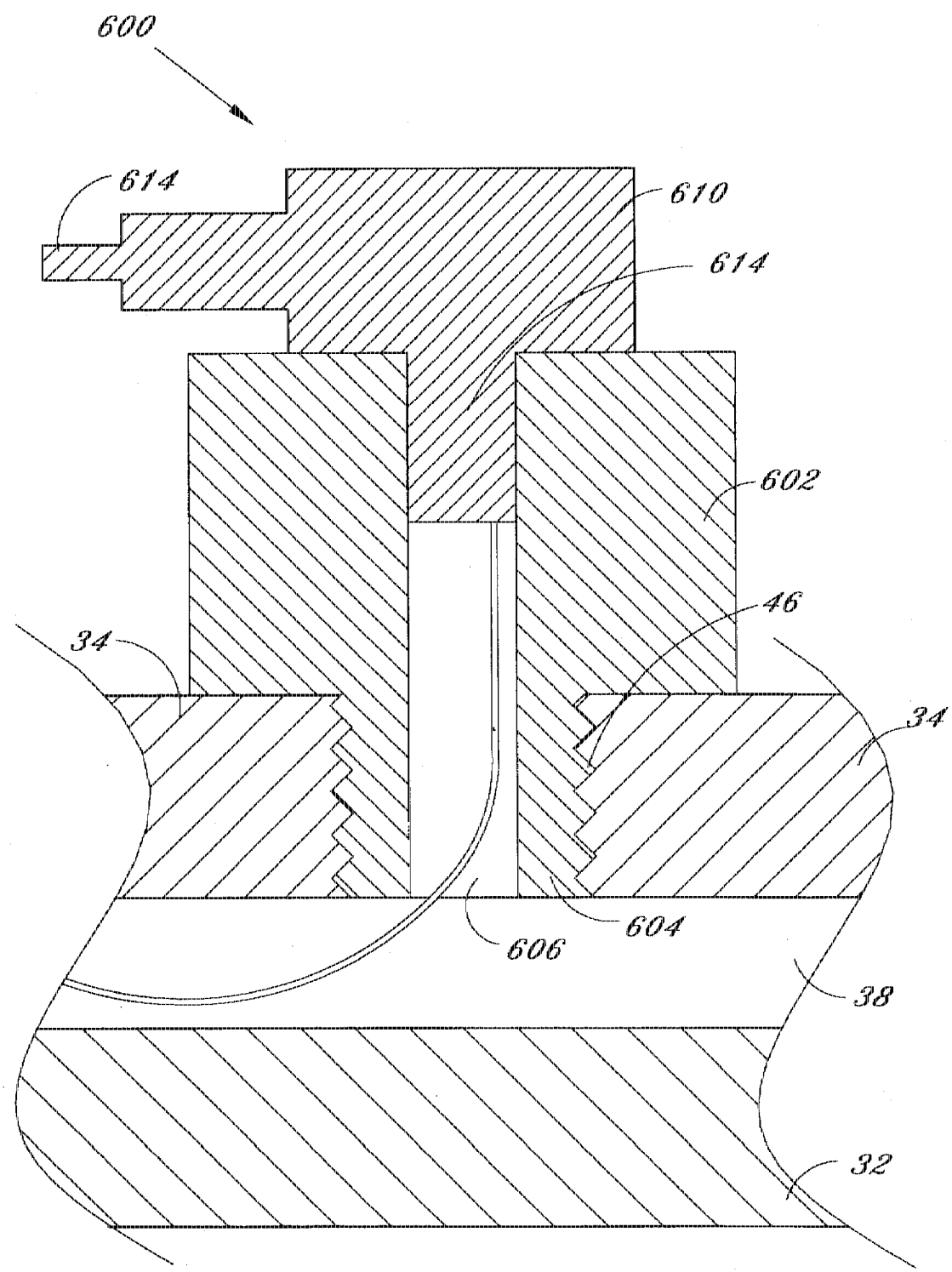
FIG. 20 is a sectional view of a portion of the submarine transponder alarm device in accordance with the present invention.

When submerged hoses are utilized, a submarine alarm device 600 (FIGS. 19 and 20) is provided and generally includes a transponder/pinger 620, connector 610, modified hose fitting 602 and underwater cable 630. Alarm device 600 can be used in conjunction with fluid leakage detector 100. Transponder 620 includes a body member 622 and an associated fastening plate which is attached at one end to body member 622 and at its opposite end to the hose nipple flange using mounting bolts/nuts 42 which are also used to clamp/lock the hose nipples 30a and 30b together.

An underwater cable 630 from submarine transponder alarm device 620 connects to an underwater connector 610 mounted to a modified hose fitting 602. Connector 610 includes a cable attachment portion 612 and a hose fitting portion 614. Hose fitting portion 614 is inserted within a passageway 606 defined by hose fitting 602. Preferably, a sealing means (not shown) is provided to seal off the point where connector 610 and hose fitting 602 are attached. A sealing means (not shown) can also be provided to seal off the point where hose fitting 602 is attached to outer flange member 34 of hose nipple 30.

Electrical power and alarm and test functions are self contained within submarine transponder 620. The electronic circuits used in the floating hose and submarine transponder alarm devices consist of similar components and functions. With alarm device 600, a pinging noise will emanate in the water and will be detected once the noise begins. The sensor utilized with alarm device is the same as sensor 230 and operates and functions similarly.

A microprocessor (not shown) having stored firmware may can also be included in printed wiring assembly 400 which can allow a defined set of polling results or all polling results to be stored with an alarm signal generated only when a statistical threshold has been exceeded.

Figure 11:
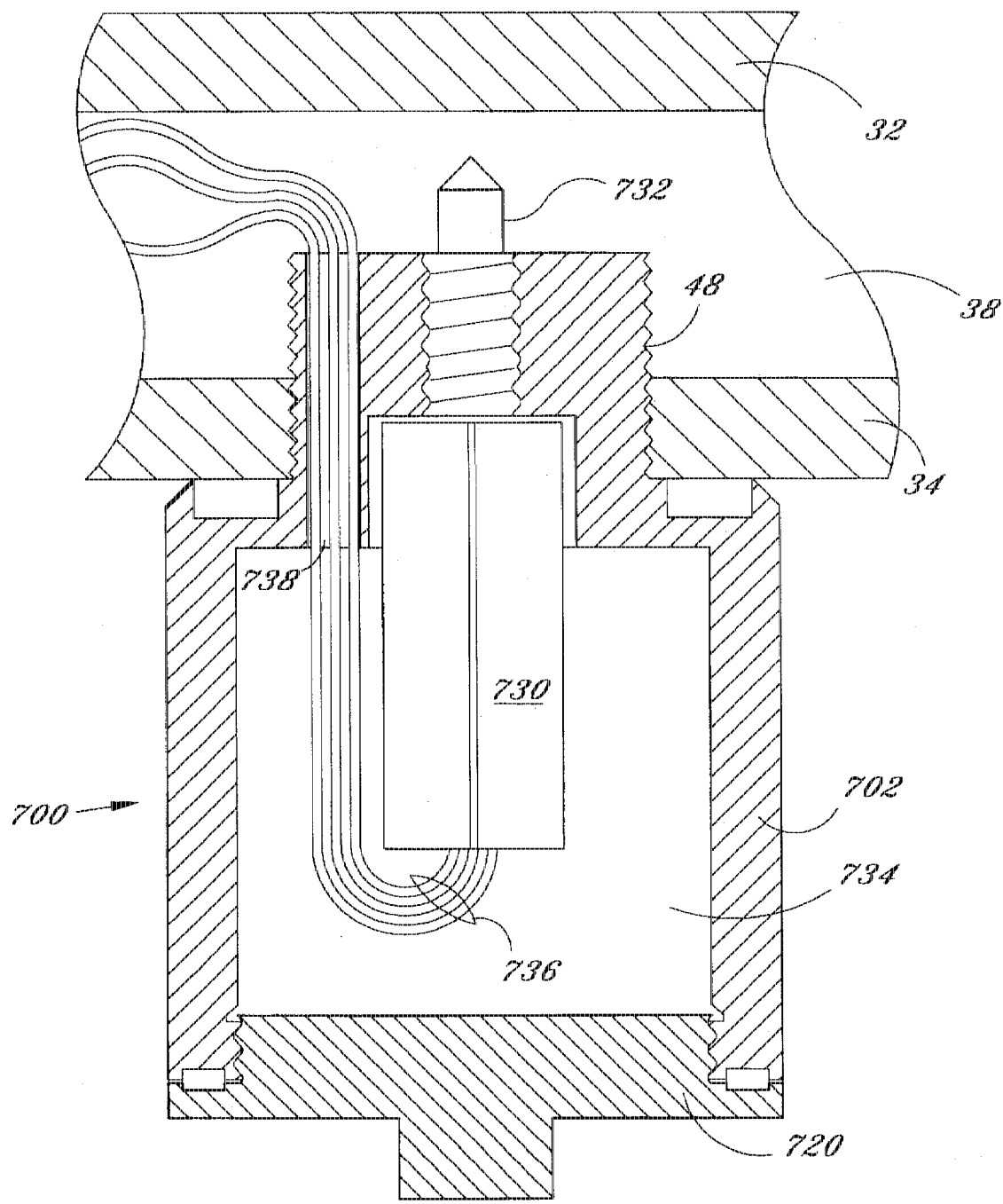
FIG. 11 is a sectional view of an alternative embodiment fluid leakage detector in accordance with the present invention.

FIG. 11 illustrates an alternative embodiment for the fluid leakage detector and is generally designated as reference numeral 700. In this embodiment, sensor 730 is inverted with prism 732 disposed within air chamber 38. In this embodiment, sensor 730 utilized fluids which have entered air chamber 38 to trigger the flashing circuit. Thus, the leaking fluids do not travel through detector 700, which reduces the chance of damaging the sensor due to the pressure of the fluids. Accordingly, no baffle, deflection plate, support plate are required with this embodiment as sensor 730 is basically out of the pressure path.

Sensor 730 merely screws into housing body 702 which in turns mates with opening 48 in outer flange member 34. A sealed cap 720 is provided to prevent fluids from entering sensor circuitry area 734 of housing body 702. Sensor 730 can be the same as sensor 230 discussed above, and operates and functions similarly. Sensor 730 can be utilized with floating alarm device 100 or submarine alarm device 600.

A slot 738 could be provided for feeding wires 736, which would require a sealing means, such as epoxy, potting compound, etc. once wires 736 fed through, to prevent fluids from entering area 734. Alternatively, a bullet type plug (not shown) including a threaded rod and connection pins at each end could also be utilized which would eliminate any pressure from fluids within area 734.

Figure 12:
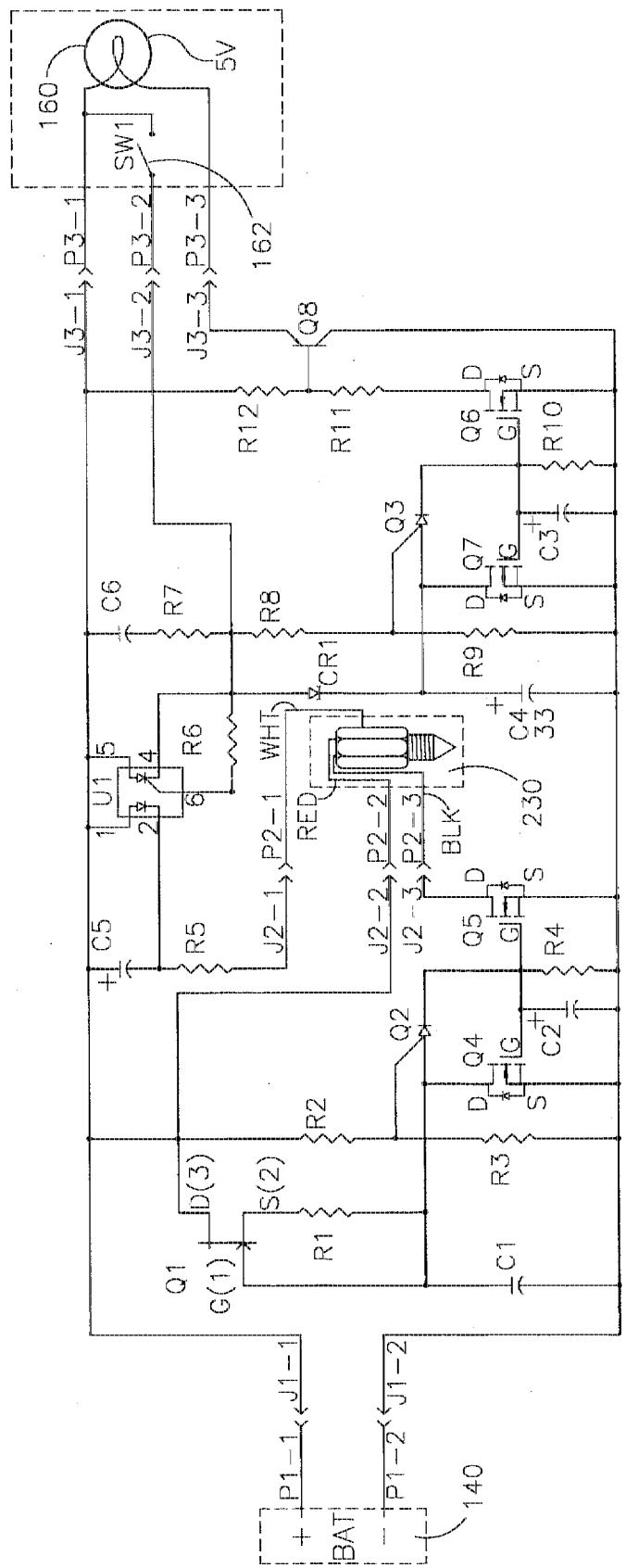
FIG. 12 is an electrical schematic of the circuitry utilized in accordance with the present invention.
Figure 17:
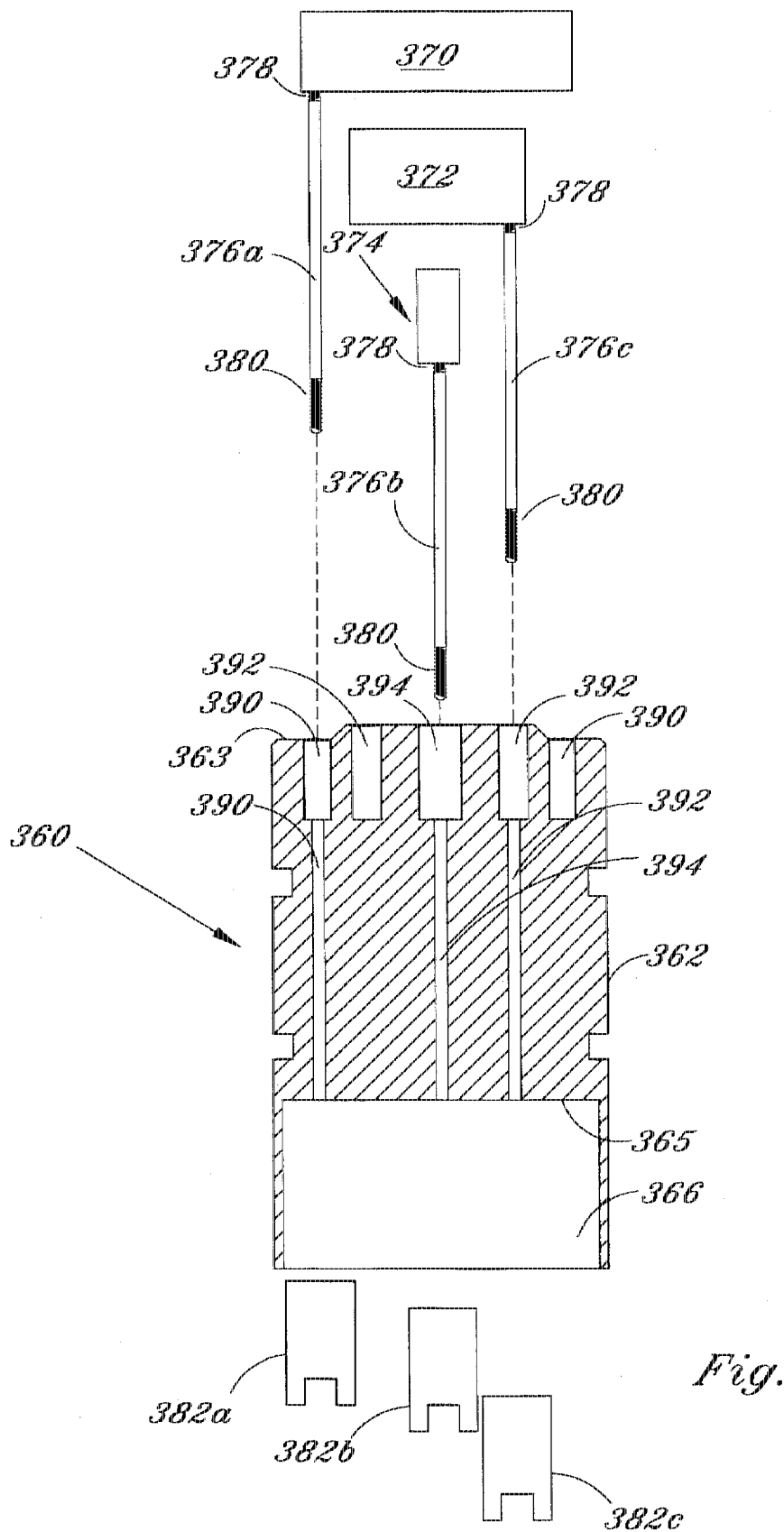
FIG. 17 is an exploded view of the lower contact assembly in accordance with the present invention.

FIG. 12 illustrates the electrical schematic of the trigger/flasher timer electronics which are preferably located on a printed wiring board such as alarm device printed wiring assembly 400. Printed wiring board 400 generally contains three assemblies (1) battery 140; (2) sensor 230; and (3) the lamp/test reed switch assembly 160/162. The electronics provide two main functions (1) a trigger timer and control; and (2) a flasher timer.

The trigger timer/control circuit generally consists of JFET Q1, programmable unijunction transistor Q2, MOSFET Q4, MOSFET Q5, an input portion of optocoupler U1, resistors R1, R2, R3 and R4, and capacitors C1 and C2. Voltage from battery 140 continuously powers the timer/control circuit. The trigger timer and control circuit generates a 100 millisecond pulse, approximately every three (3) minutes to apply power to sensor 230. The sensor output signal indicates a dry or wet condition. The result it stored, and provided as an input control to the flasher timer circuit.

Transistor Q2 functions as an oscillator with resistors R2 and R3 collectively acting as a voltage divider to set the gate voltage on transistor Q2. Thus, resistors R2 and R3 define the threshold voltage for turning on transistor Q2. JFET Q1 and resistor R1 provide a constant current source to charge timing capacitor C1. When capacitor C1 is charged to a point that the voltage of capacitor C1 and the anode of transistor Q2 exceed the threshold voltage defined by resistors R2 and R3 at the gate of transistor Q2, transistor Q2 conducts transferring the charge of capacitor C1 to capacitor C2. Capacitor C1 discharges through transistor Q2 when charging up capacitor C2. Preferably, the system is designed to take approximately three (3) minutes to charge capacitor C1 to the point where its voltage exceeds the threshold voltage defined by resistors R2 and R3.

MOSFET Q4 is provided to complete the discharge of capacitor C1 into capacitor C2 by providing a path to completely discharge capacitor C1. Once capacitor C1 has discharged to the point where its voltage and the voltage at the anode of transistor Q2 are again below the threshold voltage, transistor Q2 turns off. After charging (transistor Q2 turned off), capacitor C2 discharges through resistor R4 to keep both transistors Q4 and Q5 turned on for a period of approximately one hundred (100) milliseconds (time constant of resistor R4 and capacitor C2). The discharge time of capacitor C2 through resistor R4 determines how long transistors Q4 and Q5 are turned on.

MOSFET Q5 provides a return path for the black (ground) wire of sensor 230, providing a return to ground for approximately one hundred (100) milliseconds. As MOSFET Q5 is turned on for approximately one hundred milliseconds, sensor 230 will accordingly be powered for one hundred milliseconds. The red wire of sensor 230 always goes to the voltage source.

The white (signal) lead of sensor 230 is an open collector, TTL compatible signal which is open when sensor 230 is dry and low (ground) when sensor 230 is wet. When sensor 230 is wet, a path is provided for optocoupler (silicon controlled rectifier (SCR)) U1 to conduct. When the emitter of optocoupler U1 conducts, the SCR output stage of optocoupler U1 turns on and latches, thereby providing the control signal to start the flashing of lamp 160. This "on" state for optocoupler U1 remains until power is removed from the electronics, or test switch SW1 162 is activated. Preferably, test switch SW1 is a magnetic reed switch.

Battery 140, preferably a lithium battery, is provided with a longer life span given that sensor 230 is only turned on for one hundred (100) milliseconds every three (3) minutes. This periodicity of polling electro-optical fluid sensor 230 is adjustable to conserve the electrical power stored in lithium battery pack 140. If the polling returns a "dry" signal then sensor 230 powers down until the next polling cycle starts. Thus, battery is only using a relatively small amount of current every three (3) minutes. If the polling returns a "wet" signal then the electronic circuit latches closed which powers the flasher circuit causing light source 160 to flash.

If the polling of sensor 230 on submarine transponder alarm device 600 returns a "wet" signal then transponder 620 stores a "wet" coded signal until an underwater hydrophone queries transponder alarm device 600. If the polling of sensor 230 on transponder alarm device 600 returns a "dry" signal, then transponder 620 stores the "dry" coded signal until an underwater hydrophone queries transponder alarm device 600. Transponder alarm device 600 will transmit the appropriate coded signal to the underwater hydrophones indicating a "dry" or "wet" condition. If a "wet" condition is signaled the coded response will also identify the anti-pollution hose segment returning the "wet" signal.

Though sensor 230 is preferably powered approximately every three (3) minutes, such is not limiting and other power time intervals can be selected and are within the scope of the invention. Furthermore, though not preferred, the circuit could be design not to having this "polling" feature, wherein sensor 230 would continuously be on. However, with this embodiment, battery 140's life span would be relatively much shorter as compared to turning sensor 230 on once every three (3) minutes.

When sensor 230 is energized, its white wire is either open (dry condition) or to ground (wet condition). If it's open no path is provided for optocoupler U1's emitter to conduct (no path for current to flow). If a ground is provided by sensor 230's white wire, then optocoupler U1 conducts between pins 1 and 2 down to resistor R5 to ground. Optocoupler U1's emitter gives off IR which energizes the SCR output stage of optocoupler U1, causing five (5) volts to go from pin 5 down through the SCR output to pin 4 which provides a voltage to operate the flasher circuit. The emitter of optocoupler U1 is a diode which conducts whenever sensor 230's white wire is a ground. Current conducts from pin 1 through the diode causing the diode to give off light or to give off energy to turn on the SCR output stage.

Due to the inherent ways SCR output stage operates, once energized or turned on, the SCR output stage of optocoupler U1 latches and stays on. Thus, the power must be turned off to turn off the SCR output stage. Pin 6 of optocoupler U1 is the gate of the SCR output. Resistor R6 is provided to transfer any voltage, thus providing a path for any charge stored on the gate to leak off. Once the SCR output stage is latched, voltage comes from the top bus through the SCR output which provides a voltage drop. Thus, voltage is provided to constant current diode CR1.

The flasher circuit generally consists of programmable unijunction transistor Q3, transistors Q6, Q7 and Q8, resistors R8, R9, R10, R11 and R12, capacitors C3 and C4, constant current diode CR1 and an output portion of optocoupler U1. The flasher circuit is controlled by the output signal received from the output portion of optocoupler U1 and generates a timing for lamp 160. This timing causes lamp 160 to flash approximately two (2) per second with a 30% duty cycle. The flasher circuit operates similar to the triggering circuit but does not have voltage applied to it until the SCR output stage is turned on (wet condition).

Transistor Q3 functions as an oscillator with resistors R8 and R9 collectively acting as a voltage divider to set the gate voltage on transistor Q3. Thus, resistors R8 and R9 define the threshold voltage for turning on transistor Q3. Constant current diode CR1, which can be a low current diode, provides a constant current source to charge timing capacitor C4. When capacitor C4 is charged to a point that the voltage of capacitor C4 and the anode of transistor Q3 exceed the threshold voltage defined by resistors R8 and R9 at the gate of transistor Q3, transistor Q3 conducts transferring the charge of capacitor C4 to capacitor C3. Capacitor C4 discharges through transistor Q3 when charging up capacitor C3. Preferably, the system is designed to take approximately four hundred twenty five (425) milliseconds (approximately two times per second) to charge capacitor C4 to the point where its voltage exceeds the threshold voltage defined by resistors R8 and R9.

MOSFET Q7 is provided to complete the discharge of capacitor C4 into capacitor C3. After charging, capacitor C3 discharges through resistor R10 to keep both transistors Q6 and Q7 turned on for a period of approximately one hundred (100) milliseconds. The discharge time of capacitor C3 through resistor R10 determines how long transistors Q6 and Q7 are turned on.

MOSFET Q6 provides a ground path for current to flow to the base of emitter follower transistor Q8, causing lamp 160 to turn on for approximately one hundred (100) milliseconds every four hundred (400) milliseconds. Lamp 160 will continue to flash regardless of sensor 230's state until either test switch 162 is activated, power is depleted, or power is removed. Transistor Q6 thus provides a ground at the bottom of resistor R11 which provides a path for the current to flow to turn on transistor Q8. Resistor R11 is provided to limit the base current which will drive transistor Q8. Resistor R12 is provided to turn transistor Q8 off relatively quickly.

Transistor Q8 is not used as a switch but as an emitter follower so that there is a voltage drop across transistor Q8. Preferably, lamp 160 draws ninety (90) milliamps at five (5) volts. However, such is not limiting and other lamp specifications may be utilized and are within the scope of the invention.

Test switch 162 is preferably a magnetic reed switch which allows testing of floating system 20 without opening the alarm device which could possibly breach the water tight integrity of the alarm device. Thus, when a magnet is positioned near switch 162, switch 162 shorts which also provides a short circuit across the SCR output stage. Five (5) volts is provided to the flasher circuit which ultimately causes lamp 160 to flash as long as reed switch 162 remains in its closed position. Thus, the flashing circuitry and lamp 160 can be tested by closing reed switch 162. When the magnet is removed, reed switch opens causing flasher circuit to go back to its normal "off" stage during dry conditions. Thus, reed switch 162 can be used to reset the optocoupler U1 after the SCR output stage has been triggered. Wires 163 provide communication between the flashing circuitry and switch 162. Wires 163 are attached to circuit board 400 by a two pin connector 164. Similarly, wires 165 provide communication between light source 160 and the flashing circuitry. Wires 165 are attached to circuit board 400 also by a two pin connector 166.

Capacitor C5 is provided to filter out any signal from the white wire of sensor 230 during the first fifty (50) microseconds that the power is initially turned on. During the first fifty (50) microseconds it was found that the device does not know which state (dry or wet) that it's in because it is powering up and doesn't know what the output is. As such a low pulse, representing a wet condition, is sometimes produced, thus, creating a false alarm by triggering the flasher circuit to flash lamp 160, even if sensor 230 is dry. Capacitor C5 filters out this initial low output so the input to optocoupler U1 does not see it.

Capacitor C6 and resistor R7 form a snubber circuit which is normally provided across an SCR to reduce transients when the SCR switches. The snubber circuit filters out transients during the switching time of the SCR output stage.

FIGS. 15 through 18 illustrate upper contact or carrier assembly (connector) 320 and lower contact or carrier assembly (connector) 360 which provide electrical communication between sensor 230 and printed circuit board 400. Upper contact assembly 320 includes a housing body 322, three plungers 324, thread small braided wires 326, three springs 328 and three solder cups 330. Each plunger, braided wire, spring and solder cup is associated with a wire 180 which ultimately communicates with printed circuit board 400. Each plunger and associated wire, spring and solder cup form respective upper pin assemblies 323. Plungers 324 and solder cups 330 are conductive and preferably gold plated.

Upper housing body 320 is preferably constructed from an LE Phenolic material and holds three upper pin assemblies 323, via a non-conductive phenolic push pin 332. Upper pin assemblies 323 are aligned through the centerline of the diameter of upper housing body 322.

To construct upper pin assembly 323, conductive plunger 324 is secured and small conductive braided wire 326 is attached thereto by conventional means such as soldering at a first end of braided wire 326. Spring 328 is placed over soldered wire 326 and a portion of plunger 324 and then rotated, preferably counter clockwise, until spring 328 snaps into relief area 325 of plunger 324. At this point, a portion of the second end of wire 326 should protrude out of spring 328 for attachment to conductive solder cup 330. Preferably, the second end of braided wire 326 is soldered to solder cup 330, approximately at half of the depth of cup 330. Once attached, a portion of solder cup 330 is inserted within spring 328 and pressed until spring 328 snaps in relief area 331 of solder cup 330. Solder cups 330 are each provided with an aperture 333 extending therethrough for receipt of push pin 332, which is discussed further below. This same process is repeated for the other two plungers and associated braided wire, spring and solder cup.

After assembly, upper pin assemblies 323 are placed in associated passageways 321 formed within upper housing body 322. Passageways 321 extend through upper housing body 322 from upper housing body 322's top end 334 to its lower end 336. Upper housing body 322 also includes a pin passageway 338 which is perpendicular to passageways 321 and extends from a first side 340 to a second side 342 of upper housing body 322. Pin passageway 338 is located along upper housing body 322, adjacent to the point where solder cup apertures 333 are disposed when upper pin assemblies 323 are properly positioned within upper housing body 322.

To maintain upper pin assemblies 323 in proper position within upper housing body 322, push pin 332 is inserted through pin passageway 338 and solder cup passageways 333. Once upper pin assemblies 323 are properly positioned a contact portion 325 of plungers 324 protrudes downward from bottom end 336 of upper housing body 322. Wires 180 are each attached to the unused portion of respective solder cups 330 by conventional means such as soldering. Each wire 180 is ultimately associated with wires 290 coming from sensor 230 and should be attached to a specific upper pin assembly 323 to maintain such relationship.

Figure 18:
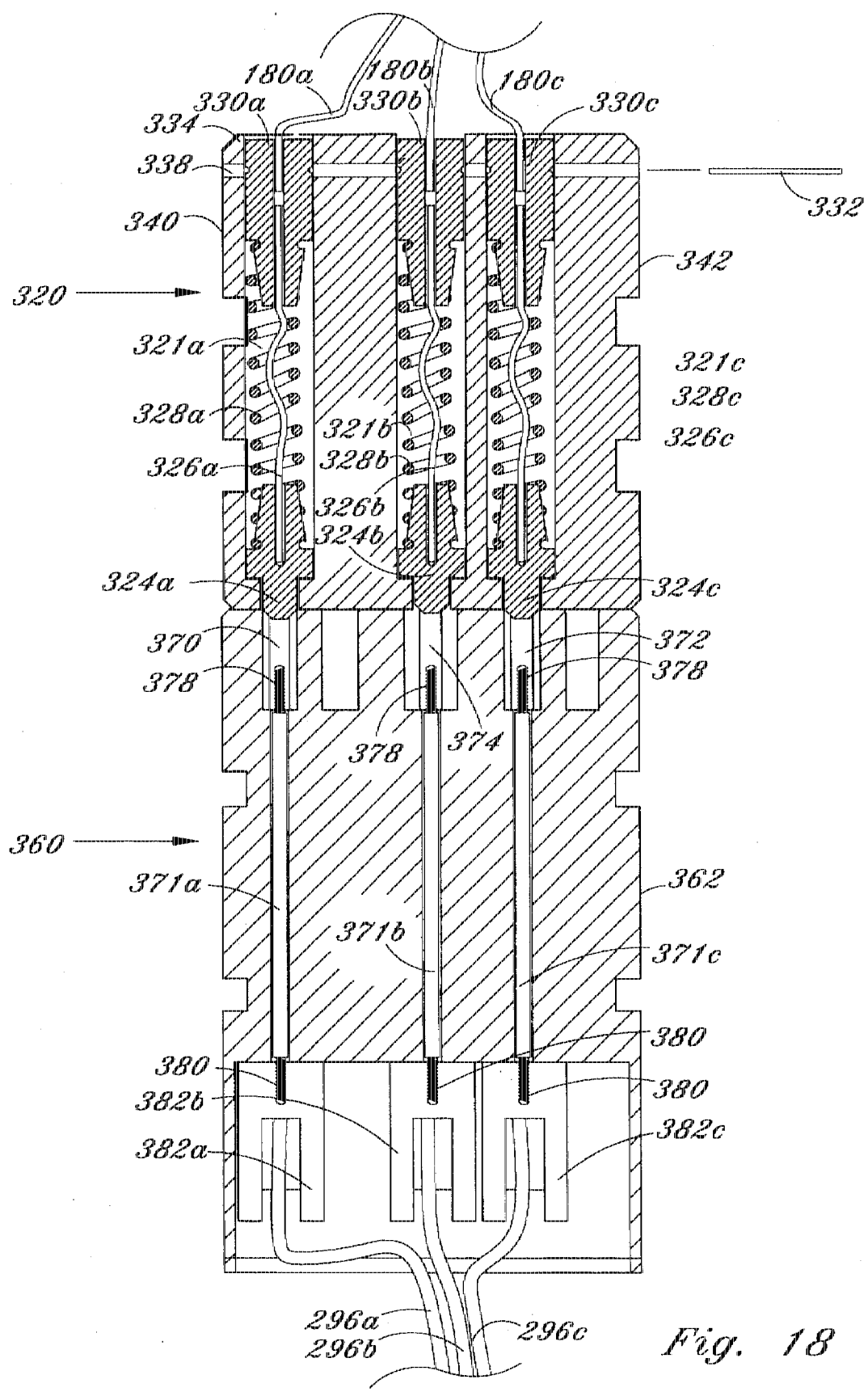
FIG. 18 is a sectional view of the upper and lower contact assemblies in accordance with the present invention.

Preferably, first wire 180a (5 V DC) is associated with the red wire coming from sensor 230, and is preferably colored red to help assure proper attachment. Similarly, second wire 180b (ground) is associated with the black wire coming from sensor 230, and is preferably colored black to help assure proper attachment. Likewise, third wire 180c (TTL output) is associated with the white wire coming from sensor 230, and is preferably colored white to help assure proper attachment. After wires 180 have been properly attached to their respective upper pin assemblies 323, wires 180 are manually formed towards the center (FIG. 18). After wires 180 have been centered, the construction of upper assembly 320 is finalized. The three 22AWG wires 180, which are each attached to associated solder cups 330, exit at their opposite end from printed wiring board 400 preferably via gold-plated board connectors 182.

Lower contact assembly 360 includes a housing body 362, an outer ring 370, an inner ring 372, a contact pad 374, three threaded rods 376, and three solder cups 382. Outer ring 370, inner ring 372 and contact pad 374 are each associated with a respective threaded rod 376 and a respective solder cup 382, each collectively forming lower pin assemblies 371. Each lower pin assembly 371 is associated with a respective wire 296 coming from sensor 230. Rings 370 and 372, contact pad 374, threaded rods 376 and solder cups 382 are conductive and preferably gold plated.

Lower housing body 362 is preferably constructed from LE Phenolic material and holds lower pin assemblies 371. Rings 370 and 372 and contact pad 374 are centered on the center of the diameter of lower housing body 362. Rings 370 and 372 and contact pad 374 conduct low voltage through associated threaded rods 376.

To construct lower pin assembly 371a, outer ring 370 is attached to rod 376a by conventional means and preferably by the mating of exterior threads 378 at the first end of rod 376a with interior threads (not shown) disposed within outer ring 370. After assembly, lower pin assembly 371a is placed in an associated passageway 390 formed within lower housing body 362. Passageway 390 extends through lower housing body from lower housing body 362's top end 363 to an intermediate point 365 wherein passageway 390 terminates into a cavity 366. A top portion of passageway 390 is circular/ring shaped for receiving outer ring 370. After proper insertion, threaded rod 376a is disposed within, as well as partially through, the rod receiving portion of passageway 390 and outer ring 370 is disposed within the ring portion of passageway 390. The portion of rod 376a which protrudes downward from passageway 390 can have threads 380 for attachment to solder cup 382a.

To construct lower pin assembly 371b, inner ring 372 is attached to rod 376b also by conventional means and preferably by the mating of exterior threads 378 at the first end of rod 376b with interior threads (not shown) disposed within inner ring 372. After assembly, lower pin assembly 371b is placed in an associated passageway 392 formed within lower housing body 362. Passageway 392 extends through lower housing body 362 from lower housing body 362's top end 363 to an intermediate point 365 wherein passageway 392 terminates into cavity 366. A top portion of passageway 392 is circular/ring shaped for receiving inner ring 392. The radius of the ring shaped top portion of passageway 392 is smaller in diameter than the diameter of the ring shaped top portion of passageway 390. After proper insertion, threaded rod 376b is disposed within, as well as partially through, the rod receiving portion of passageway 392 and inner ring 372 is disposed within the ring portion of passageway 392. The portion of rod 376b which protrudes downward from passageway 392 can have threads 380 for attachment to solder cup 382b.

To construct lower pin assembly 371c, contact pad 374 is attached to rod 376c by conventional means and preferably by the mating of exterior threads 378 at the first end of rod 376c with interior threads (not shown) disposed within contact pad 374. After assembly, lower pin assembly 371c is placed in an associated passageway 394 formed within lower housing body 362. Passageway 394 extends through lower housing body 362 from lower housing body 362's top end 363 to an intermediate point 365 wherein passageway 394 terminates into cavity 366. A top portion of passageway 394 is circular shaped for receiving contact pad 374. The radius of the circular shaped top portion of passageway 394 is smaller in diameter than the diameter of the ring shaped top portion of passageway 392. After proper insertion, threaded rod 376c is disposed within, as well as partially through, the rod receiving portion of passageway 394 and contact pad 374 is disposed within the top portion of passageway 394. The portion of rod 376c which protrudes downward from passageway 394 can have threads 380 for attachment to solder cup 382c.

After proper insertion, with all three (3) lower pin assemblies 371, the perpendicularity of threaded rods 376 must be maintained. Also after proper insertion, a respective solder cup 382 is preferably attached to the each exposed second end of rods 376 preferably by mating exterior threads 380 with interior threads (not shown) disposed within solder cups 382. Rings 370 and 372 and contact pad 374 have no orientation requirements during field installations.

Preferably, after all three (3) solder cups 382 are properly in place then wires 296 are each attached to a respective solder cup 382 by conventional means such as soldering. Each wire 296 represents one (1) of three (3) wires which are associated with sensor 230 and is attached to a specific lower pin assembly 371 corresponding to the wire attachment arrangement of upper contact assembly 320. Alternatively, the wire attachment arrangement of upper contact assembly 320 can be selected to correspond to the wire attachment arrangement of lower contact assembly 360.

Preferably, outer ring wire 296a is the red wire coming from sensor 230, and is preferably colored red to help assure proper attachment. Similarly, inner ring wire 296b is the black wire coming from sensor 230, and is preferably colored black to help assure proper attachment. Likewise, contact pad wire 296c is the white wire coming from sensor 230, and is preferably colored white to help assure proper attachment. After wires 296 have been properly attached to their respective lower pin assemblies 371, potting compound can be provided to back fill over solder cups 382_ to within one (1) millimeter from an wire attachment edge of lower housing body 362. Lastly, wires 296 are manually formed towards the center (FIG. 18). After wires 296 have been centered, the construction of lower assembly 360 is finalized. The three 22AWG wires 296 exit the rear or bottom of lower contact assembly 360 and connect to bullet type connectors 292/294 on each end of the wiring to electro-optical sensor 230.

Thus, contact assemblies 320 and 360 transfer three (3) wire connections from battery container 120, via the annulus opening 46 into the annulus ring and eventually into housing body 202 of sensor 230. The intermating surfaces of contact assemblies 320 and 360 can be recessed into battery container 120 providing protection of the electrical mating surfaces from the environmental extremes. Lower contact assembly 360 also acts as a centering guide for mounting battery container 120. Assemblies 320 and 360 are interference fitted within enclosure 120 and hose fitting 300, respectively. A potting compound can be provided to secure the interference fit.

The arrangement of the annulus plug contact assembly and the light assembly contact assembly, the design of the battery compartment and the cam lock ring create a pressure plug. Oil pressurizing the annulus plug contact assembly can not dislodge the contact assembly because of the arrangement of all the parts and the clamping of all the parts by the cam lock key. Preferably, battery housing 120, the protective cap, hose fitting 300 and clamp nut 314 are constructed from an aluminum bronze and detector housing 202 is constructed from a stainless steel material. However, such is not limiting and other materials, which can withstand the elements and environment in which alarm device 100 and detector 200 are exposed and subjected to, are within the scope of the present invention. Such other materials may include, but are limited to, other metals, as well as injection molded plastic.

Furthermore, though not shown at every point, sealing means are preferably provided at each attachment point where fluids may enter.

The present invention is designed to give the clearest indication of failure mode, day or night, and to survive and operate in the offshore environment without failure or false alarms in the severest of weather conditions. Floating alarm assembly 100, fluid leakage detector 200 and/or submarine transponder alarm device 600 are interchangeable and easily replaced with little, if any, simple hand tools. The present invention provides the dual anti-pollution safety hose user with a highly reliable, durable, complimentary system for assuring that offshore loading and discharge terminals meet the highest of operational expectations.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fluid leak detector and alarm system for use with a double carcass anti-pollution hose, said hose having an inner carcass and an outer carcass, said inner carcass and said outer carcass defining a hose air chamber, said hose having a hose nipple attached at a first end of said hose, said hose nipple having an outer flange member and an inner flange member, said outer flange member and said inner flange member defining a nipple air chamber, said hose air chamber and said nipple air chamber in fluid communication with each other, said system comprising:

means for determining breaches in the inner carcass and the outer carcass, said means for determining attached to said hose nipple; and means for providing a signal to indicate that either the inner carcass or the outer carcass has been breached, said means for providing operatively associated with said means for determining, said means for providing attached to said hose nipple.

2. The system of claim 1 wherein said means for determining is a fluid leakage detector operating regardless of pressure and at least partially disposed within a first opening in said hose nipple within a region defined between the inner carcass and the outer carcass.

3. The system of claim 2 wherein said fluid leakage detector having a body member and including a electro-optical sensor member disposed within said body member and a closed end cap attached to an outer end of said body member, a first end of said body member being attached to said hose nipple.

4. The system of claim 3 wherein fluids which have leaked into said nipple air chamber, from either a breach in the inner carcass or a breach in the outer carcass, flow through said detector body member and are captured within said closed end cap causing said sensor to detect a leak once the fluids have reached a certain volume level within said closed end cap.

5. The system of claim 2 wherein said fluid leakage detector associated with said means for providing, said fluid leakage detector signalling said means for providing upon detecting fluid leakage.

6. The system of claim 1 wherein said means for providing is a floating alarm device having a first end attached to said hose nipple.

7. The system of claim 6 wherein said floating alarm device includes a lamp assembly which flashes periodically upon receiving a fluid leakage signal from said means for determining.

8. The system of claim 1 further including means for periodically powering said means for determining to extend the lifespan of a power means associated with said system.

9. The system of claim 1 wherein said means for providing is a pinger transponder attached to said hose nipple by a fastening plate.

10. The system of claim 2 wherein said fluid leakage detector having a body member and including a electro-optical sensor member disposed within said body member and a closed end cap attached to an outer end of said body member, a first sensor end of said body member being attached to said hose nipple, said sensor including a prism member disposed within hose nipple air chamber when said fluid leakage detector is properly attached.

11. A fluid leak detector and alarm system for use with a double carcass anti-pollution hose, said hose having an inner carcass and an outer carcass, said inner carcass and said outer carcass defining a hose air chamber, said hose having a hose nipple attached at a first end of said hose, said hose nipple having an outer flange member and an inner flange member, said outer flange member and said inner flange member defining a nipple air chamber, said hose air chamber and said nipple air chamber in fluid communication with each other, said system comprising:

a fluid leakage detector member having a housing body and including an electro-optical sensor and a closed end cap, said housing body having a first end which mates with a first hose nipple opening, said closed end cap attached to a second end of said housing body, said fluid leakage detector member capable of determining breaches in the inner carcass and the outer carcass, said fluid leakage detector member operating regardless of pressure and at least partially disposed within a first opening in said hose nipple within a region defined between the inner carcass and the outer carcass;

a floating alarm assembly including a light source, said alarm assembly attached at its first end to a second hose nipple opening, said light source disposed at a second end of said alarm assembly, said floating alarm assembly in electrical communication with said fluid leakage detector; and means for periodically polling said sensor to determine whether a fluid leak is present;

wherein fluids which have leaked into said nipple air chamber, from either a breach in the inner carcass or a breach in the outer carcass, flow through said detector housing body and are captured within said closed end cap causing said sensor, once powered by said means for periodically polling, to detect a leak once the fluids have reached a certain volume level within said closed end cap;

wherein once a leak is detected by said sensor, said fluid leakage detector provides a signal to said floating alarm assembly causing said light source to flash.

12. A fluid leak detector and alarm system for use with a double carcass anti-pollution hose, said hose having an inner carcass and an outer carcass, said inner carcass and said outer carcass defining a hose air chamber, said hose having a hose nipple attached at a first end of said hose, said hose nipple having an outer flange member and an inner flange member, said outer flange member and said inner flange member defining a nipple air chamber, said hose air chamber and said nipple air chamber in fluid communication with each other, said system comprising:

a fluid leakage detector member having a housing body and including an electro-optical sensor and a closed end cap, said housing body having a first end which mates with a first hose nipple opening, said closed end cap attached to a second end of said housing body, said fluid leakage detector member capable of determining breaches in the inner carcass and the outer carcass, said fluid leakage detector member operating regardless of pressure and at least partially disposed within a first opening in said hose nipple within a region defined between the inner carcass and the outer carcass;

a floating alarm assembly including a light source, a battery member sealed within a battery enclosure, and a protective cap having a lens member, said light source disposed within said protective cap, said protective cap attached to a top end of said battery enclosure;

means for attaching a bottom end of said battery enclosure to a second hose nipple opening;

means for providing communication between said fluid leakage detector and said floating alarm assembly; and means for periodically polling said sensor to determine whether a fluid leak is present;

wherein fluids which have leaked into said nipple air chamber, from either a breach in the inner carcass or a breach in the outer carcass, flow through said detector housing body and are captured within said closed end cap causing said sensor, once powered by said means for periodically polling, to detect a leak once the fluids have reached a certain volume level within said closed end cap;

wherein once a leak is detected by said sensor, said fluid leakage detector communicates with said floating alarm assembly via said means for providing to cause said light source to flash.

13. The system of claim 12 further including a test switch disposed within said protective cap and in communication with said means for providing.

14. The system of claim 12 wherein said means for attaching is a hose fitting and a clamp nut, wherein said hose fitting attached to said hose nipple and wherein said clamp nut attaching said battery enclosure to said hose fitting.

15. The system of claim 12 wherein said protective cap further including rib members to provide protection to said lens member.

16. The system of claim 12 wherein said lens member is colored amber.

17. The system of claim 12 wherein said fluid leakage detector further including a deflection plate to redirect leakage fluids traveling through said detector housing body.

18. The system of claim 12 wherein said fluid leakage detector further including a plate member disposed within said housing body to support said sensor.

19. The system of claim 18 wherein said plate member is maintained within said housing body by a retaining ring.

20. The system of claim 12 further including sealing means at various attachment points of said system to prevent water from entering said system.

21. A leak detection system for a dual carcass hose, said hose having a primary carcass and a secondary carcass, said system comprising:

means for detecting breaches in the primary carcass and the secondary carcass of said dual carcass hose, said means for detecting leaks is disposed within a region defined between the primary carcass and the secondary carcass; and means for indicating that either the primary carcass or the secondary carcass has been breached, said means for indicating operatively associated with said means for detecting, at least a portion of said means for indicating disposed to an external area of said dual carcass hose.

22. The leak detection system of claim 21 wherein said means for detecting perceives the presence of various liquids, regardless of pressure.

23. The leak detection system of claim 22 wherein said means for detecting is an electro-optic sensor.

24. The leak detection system of claim 21 wherein at least a portion of said means for detecting is disposed through an annular passage of a built-in nipple which is disposed at the end of the dual carcass hose.

25. A method for determining leaks in both a primary carcass and a secondary carcass of a dual carcass hose, said method comprising the steps of:

(a) providing at least a sensing portion of a fluid leakage detector within a region defined between the primary carcass and the secondary carcass;

(b) sensing a predetermined amount of fluid which may accumulate in the region defined between the primary carcass and the secondary carcass from a breach in either the primary carcass or a breach in the secondary carcass; and (c) providing an alarm when said fluid leakage detector determines that either the primary carcass or the secondary carcass has been breached.

* * * * *